United States Patent [19]
Shah et al.

[11] Patent Number: 5,982,950
[45] Date of Patent: Nov. 9, 1999

[54] FREQUENCY SHIFTER FOR ACQUIRING AN OPTICAL TARGET

[75] Inventors: Govind Shah, Princeton Junction; David Goodwin Shaw, Middletown Township, Monmouth County; Donald Gordon Chandler, Princeton, all of N.J.

[73] Assignee: United Parcel Services of America, Inc., Atlanta, Ga.

[21] Appl. No.: 08/331,168

[22] Filed: Oct. 28, 1994

Related U.S. Application Data

[60] Continuation of application No. 08/172,377, Dec. 22, 1993, abandoned, which is a division of application No. 08/109,692, Aug. 20, 1993, Pat. No. 5,291,564.

[51] Int. Cl.⁶ ..................................................... G06K 9/20
[52] U.S. Cl. ............................................................. 382/282
[58] Field of Search .................................. 382/1, 17, 48; 235/494, 100, 191, 282

[56] References Cited

U.S. PATENT DOCUMENTS

| | | |
|---|---|---|
| 3,947,833 | 3/1976 | Eckstein, Jr. . |
| 4,348,735 | 9/1982 | Hertz et al. .............................. 364/724 |
| 4,361,875 | 11/1982 | Hertz et al. .............................. 364/724 |
| 4,497,065 | 1/1985 | Tisdale et al. . |
| 4,737,728 | 4/1988 | Nakamura et al. ...................... 329/110 |
| 4,739,401 | 4/1988 | Sacks et al. . |
| 4,870,482 | 9/1989 | Yasuki et al. .............................. 358/31 |
| 4,874,936 | 10/1989 | Chandler et al. .......................... 382/48 |
| 4,896,029 | 1/1990 | Chandler et al. .......................... 382/48 |
| 4,905,292 | 2/1990 | Wentworth et al. . |
| 4,998,010 | 3/1991 | Chandler et al. ............................ 382/1 |
| 5,027,422 | 6/1991 | Peregrim et al. . |
| 5,067,018 | 11/1991 | Sakamoto et al. ....................... 358/142 |
| 5,184,219 | 2/1993 | Cho ......................................... 358/141 |
| 5,200,811 | 4/1993 | Cho ........................................... 358/12 |
| 5,226,083 | 7/1993 | Taguchi ..................................... 381/36 |
| 5,274,361 | 12/1993 | Snow ....................................... 345/166 |
| 5,291,564 | 3/1994 | Shah et al. .................................. 382/1 |

OTHER PUBLICATIONS

Patent Abstracts of Japan, vol. II, No. 110 (E–496) 1985.
IBM Technical Disclosure Bulletin, vol. 22, No. 6, Nov., 1979, New York U.S., p. 2250, A.J. Dattilo and M.C. Nielson, "Variable Resolution Linear Array Scanner".

*Primary Examiner*—Jose L Couso
*Attorney, Agent, or Firm*—T. Daniel Christenbury

[57] ABSTRACT

A method and system for acquiring an optical target affixed to a surface of a package with an optical scanning device. Height information associated with the height of the surface of the package is sensed and a height signal representative of a scanning distance between the optical target and the optical scanning device is generated. The package surface is scanned with the optical scanning device to generate an optical target input signal. The optical target input signal is converted in accordance with a first sampling frequency to provide a converted input signal, and a second resampling frequency is adjusted in accordance with the height signal. The converted input signal is reconverted in accordance with the second resampling frequency to generate a frequency shifted optical target signal, and the optical target on the surface of the package is acquired in accordance with the frequency shifted optical target signal.

8 Claims, 13 Drawing Sheets

FREQUENCY SHIFTER FOR ACQUIRING AN OPTICAL TARGET

This is a continuation of application Ser. No. 08/172,377 filed on Dec. 22, 1993 now abandoned which is a division of U.S. application Ser. No. 08/109,692 filed Aug. 20, 1993 now U.S. Pat. No. 5,291,564.

1. FIELD OF THE INVENTION

This invention relates to the field of optical reading of an optically encoded label, and in particular, to a system for recognizing an acquisition target disposed upon such an optically encoded label.

2. STATEMENT OF RELATED ART

Merchandise, various component parts, letters, packages, containers and a whole gamut of related items being shipped or transported frequently must be identified with information regarding origin, flight number, destination, name, price, part number and numerous other kinds of information. In other applications, the reading of encoded information printed on labels affixed to such items permits automation of sales figures and inventory as well as the operation of electronic cash registers. Other applications for such encoded labels include the automatedrouting and sorting of mail, parcels, baggage, and the like, and the placing of labels bearing manufacturing instructions on raw materials or component parts in a manufacturing process. Labels for these types of articles are conventionally marked with bar codes, one of which is the Universal Product Code. Numerous other bar code systems are also known in the art.

Commercially-available bar code systems typically lack sufficient data density to accommodate the present and increasing need to encode more information on labels of decreasing size. Attempts to reduce the overall size and spacing of bars in various bar code systems in order to increase data density have not solved this problem. Optical scanners having sufficient resolution to detect bar codes comprising contrasting bars spaced five mils or less apart are generally not economically feasible to manufacture because of the sophisticated optical apparatus required to resolve bit-encoded bars of these dimensions. Additionally, the close tolerances inherent in the label printing process make providing such a label very difficult.

Alternatively, to accommodate increased amounts of data, very large bar code labels have been provided. However, when bar codes large enough to accommodate the increased data are used the labels are not compact enough to fit on small articles. Another important factor is the cost of the label medium, such as paper. A small label has a smaller paper cost than a large label. This cost is an important factor in large volume operations. Thus labels using large bars may be too expensive.

Alternatives to bar codes include: circular formats using radially disposed wedge-shaped coded elements, such as those disclosed in U.S. Pat. No. 3,553,438 issued to Melvin, et al., on Jan. 5, 1971, entitled "Mark Sensing System", or concentric black and white bit-encoded rings, such as those disclosed in U.S. Pat. No. 3,971,917 issued to Maddox, et al., on Jul. 27, 1976, and entitled "Labels and Label Readers" and U.S. Pat. No. 3,916,160 issued to Knockeart, et al., on Oct. 28, 1975, and entitled "Coded Label for Automatic Reading Systems"; grids of rows and columns of data-encoded squares or rectangles, such as in U.S. Pat. No. 4,286,146, issued to Masakazu, et al., on Aug. 25, 1981, and entitled "Coded Label and Code Reader for the Coded Label"; microscopic spots disposed in cells forming a regularly spaced grid, as disclosed in U.S. Pat. No. 4,634,850 issued to Buxton, et al., on Jan. 6, 1987, and entitled "Quad Density Data System"; and densely packed multicolored data fields of dots or elements, such as those described in U.S. Pat. No. 4,488,679, issued to Bockholt, et al., on Dec. 18, 1984, and entitled "Code and Reading System".

Some of the coding systems described in the foregoing examples and other coding systems known in the art primarily suffer from deficiencies in data density, such as in the case of encoded circular patterns and grids of rectangular or square boxes. Alternatively, in the case of the grids comprised of microscopic spots or multicolored elements referred to above, such systems require special orientation and transport means, thus limiting their utility to highly controlled reading environments. U.S. Pat. No. 4,874,936, issued to Chandler, et al., on Oct. 17, 1989, and entitled "Hexagonal Information Encoding Article Process and System" and U.S. Pat. No. 4,896,029, also issued to Chandler, et al., on Jan. 23, 1990, and entitled "Polygonal Information Encoding Article, Process, and System," disclose labels for storing information encoded polygons which store densely packed information and may be read at high speed in any direction. The labels in the systems of Chandler use concentric rings for target acquisition. Systems, such as the ones taught by Chandler, must detect the presence of the concentric rings of the acquisition target upon labels under difficult operating conditions.

Modern conveyor systems may have conveyor belt widths of three to four feet and belt speeds of one hundred inches per second or more. They carry packages of varying heights on which information encoded labels are affixed. Thus it can be very difficult for optical systems and decoding systems to acquire the target and read the data encoded labels on these rapidly moving packages. Under these circumstances it is difficult for an optical scanner to simply acquire the label image using, for example, the rings taught by Chandler, et al. Once acquired or identified, the label image must be accurately decoded before the next operation on the package in the conveyor system takes place, often in a fraction of a second. These problems have led to the need for providing a simple, rapid and low-cost means of detecting and signaling the presence of a data-encoded label within the field of view of an optical scanner mounted in a manner to permit scanning the entire conveyor belt.

Data arrays having acquisition targets other than the concentric rings taught by Chandler, et al. are known in the art; for example, concentric geometric figures other than rings, such as squares, triangles, hexagons and numerous variations thereof, such as described in U.S. Pat. Nos. 3,513,320, issued to Weldon, on May 19, 1970, and entitled "Article Identification System Detecting Plurality of Colors Disposed on an Article", and 3,603,728, issued to Akimura, on Sep. 7, 1979, and entitled "Position and Direction Detecting System Using Patterns". U.S. Pat. Nos. 3,693,154, issued to Akimura et al., on Sep. 19, 1977, and entitled "Method For Detecting the Position and Direction of a Fine Object", and 3,801,775, issued to Aiker, on Apr. 2, 1974, and entitled "Method and Apparatus for Identifying Objects" also describe systems using symbols comprising concentric circles as identification and position indicators, which symbols are affixed to articles to be optically scanned.

However, the system of Aiker uses two separate symbols to determine the identification of the data field and its position, thereby increasing the complexity of the printing of the label and the logic circuitry required to detect the symbols, as well as reducing the data-carrying capacity of the associated data field. Also, when two symbols are used, damage to one causes problems in locating the position of the data field and the attendant ability to recover information from the data field. In the latter system, separate position and orientation markings are utilized at opposite ends of data tracks having data-encoded linear markings of only limited data carrying capability. These systems, however, suffer the drawback of requiring two separate symbols. The first symbol is required for acquiring the image and the second is required for determining the orientation of the image. Also, the process of matching the digitized signal output of the optical sensor with a predetermined bit sequence representing both the position and orientation symbols may produce erroneous readings because the prior art label acquisition systems provide a fixed characterization of the acquisition target signal level.

The foregoing systems are generally scanned with an optical sensor capable of generating a video signal output. The video output signal corresponds to the change in intensity of light reflected off the data array and is therefore representative of the position and orientation of the scanned symbols. The video output of such systems, after it is digitized, has a particular bit pattern which may be matched to a predetermined bit pattern. A common bit pattern of this type is a simple harmonic. It is well known to detect the presence of harmonics in both the digital and the analog domains. However, in high speed optical systems for acquiring digital data the recognition of the target must take place in much less time than is available to recognize, for example, the touch tone of a telephone. Thus, it would be desirable to provide a system for reliably identifying the harmonics caused by an optical scan of a common optical acquisition target from a signal which lasts only as long is the acquisition target is actually scanned.

U.S. Pat. No. 3,553,438, issued to Melvin, discloses a circular data array having a centrally-located acquisition target comprising a series of concentric circles. The acquisition target provides an image which may by used by an optical scanning device to locate the label. The acquisition target of Melvin also permits determination of the geometric center of the label and the geometric center of the data array. This is done through logic circuitry which recognizes the pulse pattern representative of the bulls-eye configuration of the concentric ring acquisition target. However, as in the case of bar codes, the data array has only a limited data capacity and the system requires both linear and circular scanning processes. Use of both linear and circular scans for a system of such limited data capacity creates undesirable complexity in the system for a slight gain in data capacity over conventional bar codes.

Thus it is necessary for optical scanning systems to acquire a target under very difficult circumstances. These targets may appear at different locations within the scanning field and may be moving rapidly. Additionally, acquisition targets may be disposed at varying distances from the optical scanning device. For example, labels on packages may be scanned at varying distances because of the varying package sizes. This introduces magnification into the sampled sequence provided by the optical scanning device to represent the scanned acquisition target. The closer the acquisition target is to the scanning device, the larger it appears and the lower the frequency of the sampled sequence. Detection of the varying frequencies caused by varying amounts of magnification can be difficult since digital filters with adjustable poles and zeros may be expensive and complicated. Additionally the varying distance introduces the need for focussing in order to accurately scan the acquisition target.

There are two common solutions to these problems known in the prior art. One common solution to the focusing problem known in the prior art is using a depth of focus sufficient to permit detection of acquisition targets at varying distances from the optical scanning device. A common solution to the magnification problem is fixing the distance between the optical scanning device and the acquisition target in order to prevent magnification.

Prior art references teaching the use of a large depth of focus to avoid focusing problems include: U.S. Pat. No. 4,544,064, entitled "Distribution Installation for Moving Piece Goods" issued to Felder, U.S. Pat. No. 3,801,775, entitled "Method and Apparatus for Identifying Objects", issued to Acker, U.S. Pat. No. 3,550,770, entitled "Method for Automatic Sorting or Recording of Objects and Apparatus for Carrying Out the Method", issued to Lund, and U.S. Pat. No. 4,454,610, entitled "Methods and Apparatus for the Automatic Classification of Patterns" issued to Sziklai.

Examples of references teaching a fixed distance between the acquisition target and the optical scanning device include: U.S. Pat. No. 3,971,917 entitled "Labels and Label Readers" issued to Maddox et al., and U.S. Pat. No. 3,757,090, entitled "Mechanical Reading and Recognition of Information Displayed on Information Carriers;", issued to Haefeli, et al.

A solution to both the focusing problem and the magnification problem is adjusting the distance between the acquisition target and the optical scanning device. U.S. Pat. No. 4,776,464, issued to Miller, teaches this type of adjustment. However, this method is mechanically difficult for a large number of quickly moving and closely spaced packages of widely varying heights.

SUMMARY OF THE INVENTION

An optical target is acquired by an optical scanning system according to an in-band target frequency in an input signal from an optical scanning device. Both the in-band energy level and the out-of-band energy level of the input signal from the optical scanning device are determined. These two energy levels are compared and a possible detection of the target is determined according to this comparison. A minimum threshold of in-band energy is required in order for the possible detection to be confirmed. The input signal may have various frequencies due to differing amounts of magnification of the acquisition target as scanned by the optical scanning device. Thus the input signal may represent the target as various frequencies due to the differing amounts of magnification. The various amounts of magnification of the acquisition target are due to differing scanning distances between the scanning device and the acquisition target. Magnification compensation is therefore performed by providing an amount of shifting of the center frequency of a filter or of the input signal. The amount of shifting is determined according to scanning distance. The shifting of the frequency is accomplished by performing digital-to-analog conversion on the digital input signal at a fixed frequency. The output of the digital-to-analog converter is applied to an analog-to-digital converter where the analog signal is resampled at a varying resampling frequency. When the resampling frequency differs from the sampling frequency the center frequency of the filter may be effectively shifted. Alternately, the resampled signal may be buffered and reclocked, in which case the frequency of the input signal is effectively shifted. In order to vary the amount of frequency shift according to the scanning distance, the resampling frequency applied to the analog-to-digital converter is varied according to the scanning distance. The relationship between the various resampling frequencies and the various scanning distances may be selected to cause the various input frequencies representative of a scanned acquisition target to be shifted to a single predetermined fundamental frequency.

DETAILED DESCRIPTION OF THE INVENTION

Figure 1:
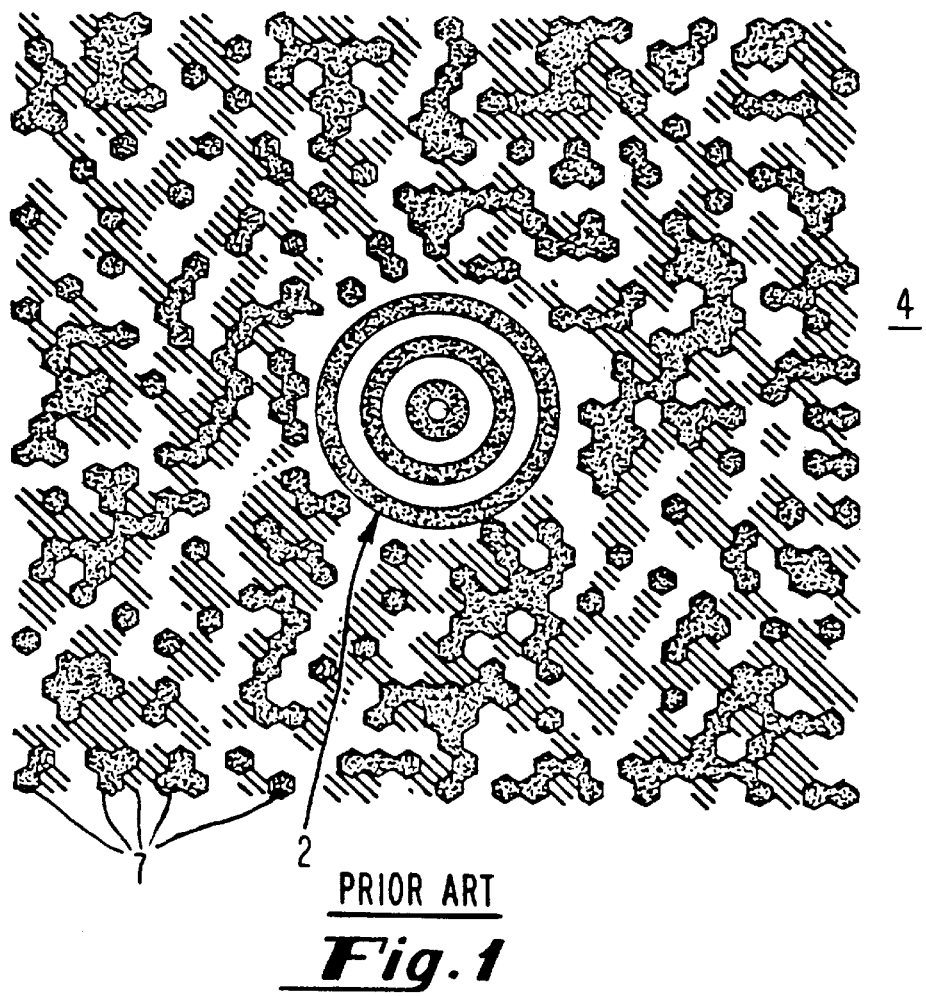
FIG. 1 is a plan view of a prior art optically-readable label having contiguously-arranged polygons of three optical properties for encoding binary data wherein the label is provided with a concentric ring acquisition target.
Figure 2:
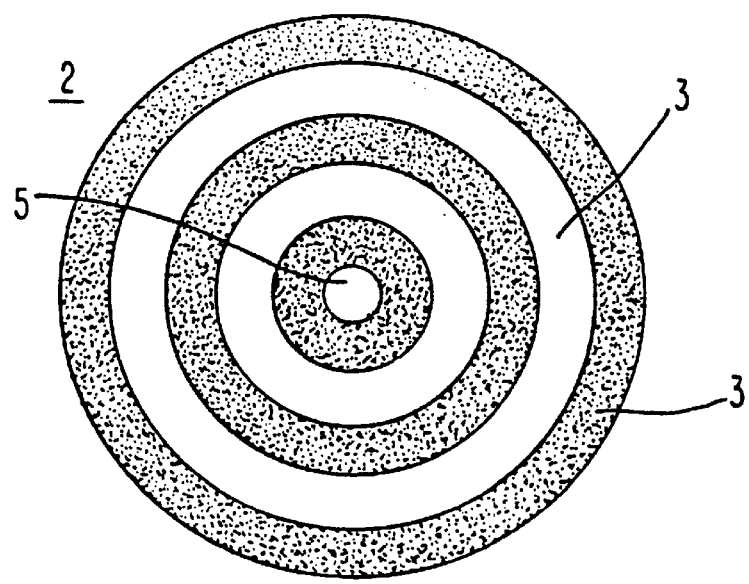
FIG. 2 is a plan view of the prior art optically-readable concentric ring acquisition target provided within the preferred embodiment of the optically-readable label of FIG. 1.

Referring now to FIGS. 1, 2, there is shown prior art concentric ring acquisition target 2 within prior art optically readable label 4. Concentric ring acquisition target 2 is formed of center circle 5 and a plurality of concentric rings 3 and may be acquired by the optical scanning system of the present invention. Acquisition target 2 or bulls-eye 2, comprising a plurality of concentric rings 3, is preferably disposed at the center of optically readable label 4.

In the preferred embodiment of optically readable label 4 there are provided approximately eight hundred eighty eight polygons 7 or information encoded cells 7 in addition to concentric ring acquisition target 2. Optically readable label 4 having eight hundred eighty eight polygons 7 may be approximately one-inch by one-inch. Polygons 7 may represent data for decoding by the optical scanning system of the present invention. However, it will be understood by those skilled in the art that the system of the present invention may be applied to acquisition targets disposed on any surface, with data in any configuration. Additionally, the system of the present invention may be applied to acquisition targets with or without data.

The eight hundred eighty eight polygons 7 of one-inch by one-inch optically readable label 4 are arranged in thirty-three horizontal rows and thirty vertical columns. Each individual hexagon 7 of optically readable label 4 has a diameter of about eight tenths of a millimeter, and may be designed to be a polygon having other than six sides. In the preferred embodiment of optically-readable label 4, hexagons 7 are aligned in staggered and overlapping vertical columns, with alternate vertically spaced information encoded hexagons 7 having co-linear axes in order to maximize the density of hexagons 7 on optically readable label 4.

Concentric rings 3 and center circle 5 of acquisition target 2, as well as polygons 7, are formed by a process which provides them with two or more different optical properties. For example, concentric rings 3 and center circle 5 of acquisition target 2 and polygons 7 may be provided with contrasting colors. Those colors may be white, black, or grey. However, it will be understood by those skilled in the art that other contrasting colors may be used to form acquisition target 2 and polygons 7. The particular shades of white, black and grey may be selected to achieve optimum contrast for ease of identification by an electro-optical sensor within the scanning system of the present invention. The grey level is preferably selected so that its optical properties fall approximately midway between the optical properties of the white regions end the black regions of optically readable label 4.

Optically readable label 4 may be formed as a discrete label 4 which may be affixed to a surface such as the surface of a package. Additionally, if an acceptable color background such as white is used, optically readable label 4 may be printed directly on the package surface without use of a discrete label. Because of the importance of having a controlled optical property background for each of the contrasting colors, it is preferable to use a discrete label 4, because the background of optically readable label 4 is more easily controlled when label 4 is discrete.

Labels such as the preferred embodiment of optically readable labels 4 are taught in U.S. Pat. No. 4,874,936, issued to Chandler, et al., on Oct. 17, 1989, and entitled "Hexagonal Information Encoding Article, Process and System," and U.S. Pat. No. 4,896,029 issued to Chandler et al. on Jan. 23, 1990, and entitled "Polygonal Information Encoding Article, Process and System," which are both incorporated by reference herein.

As previously described, concentric ring acquisition target 2 comprises center circle 5 and a plurality of concentric rings 3 of contrasting colors such as black, gray, and white. Concentric ring acquisition target 2 is preferably located at the geometric center of optically readable label 4 to make it less susceptible to being damaged or destroyed in whole or in part if the periphery of optically readable label 4 is torn, soiled, or damaged. The number of concentric rings 3 within concentric ring acquisition target 2 may be varied, but six concentric rings 3 have been found to be acceptable. When acquisition target 2 formed of center circle 5 and six concentric rings 3 is scanned through its center by an optical scanning device, a harmonic sampled sequence of eleven half-cycles is produced. One half cycle is produced each of the two times the scan crosses an individual concentric circle 3 and one half cycle is produced when center circle 5 is scanned.

Concentric ring acquisition target 2 may be of any overall diameter equal to or smaller than the overall data array of optically readable label 4. The area of concentric ring acquisition target 2 may be twenty-five percent of the area of optically readable label 4. In the preferred embodiment, concentric ring acquisition target 2 forms approximately seven percent of the area of optically readable label 4. Preferably concentric ring acquisition target 2 is as small as possible because the amount of information which may be encoded upon optically readable label 4 is decreased when a larger area of optically readable label 4 is occupied by concentric ring acquisition target 2.

In the preferred embodiment of concentric ring acquisition target 2, a diameter of approximately seven and one-half millimeters for outermost ring 3 of target 2 provides a satisfactory acquisition target on one inch square optically readable label 4 without unduly interfering with the amount of information which may be encoded in the array of polygons 7 which surrounds target 2. Fractional polygons 7 which are contiguous with the outer boundary of outermost concentric ring 3 of concentric ring acquisition target 2 are not utilized for the purpose of encoding information within optically readable label 4 within the system of the present invention.

An acquisition target suitable for detection using the system of the present invention may take shapes other than the shape of concentric ring acquisition target 2. For example, eccentric rings, concentric or eccentric squares, spirals or other polygons may be used in order to create transitions of contrasting concentric figures. Furthermore, it will be understood by those skilled in the art that any alternate geometry may be used provided that linear sections through acquisition target 2 formed with such alternate geometries create predetermined and identifying transitions in optical properties, susceptible to being sensed by an electro-optical sensor. Note that although a spiral is not a collection of concentric circles, depending on the size and radius of the spiral, a close approximation of concentric circles may be achieved using a spiral. It will therefore be understood by those skilled in the art that acquisition targets having geometries other than the geometry of concentric ring acquisition target 2 may be acquired using the system and method of the present invention.

Acquisition target 2 formed of concentric rings 3 is preferred over, for example, squares or hexagons, because the signal generated by an optical scan through the center of such a concentric ring acquisition target 2 has a frequency which is the same when the scan is performed in any direction. Thus, concentric ring acquisition target 2 is rotationally independent. This makes identification of concentric ring acquisition target 2 easier than other geometries and allows identification of the location of the acquisition target 2 with a one-dimensional search of the analog or digital output of the electro-optical scanner. However, it will be understood that the system and method of the present invention may be practiced with rotationally dependent as well as rotationally independent acquisition targets.

In an alternate embodiment, the system of the present invention may perform a two-dimensional search for increased accuracy when the scan signal is analyzed. Such a scan may be either a digital or an analog scan. Additionally, concentric rings 3 having varying annular thicknesses may be used rather than concentric rings 3 having substantially equal thicknesses and center circle 5 having a diameter differing from the thickness of concentric rings may be used. When concentric rings 3 of varying annular thicknesses are scanned by the system of the present invention, a waveform similar to a radar chirp is produced when concentric rings having varying thicknesses are optically scanned. This chirp waveform differs from the harmonic waveform produced by a scan of concentric rings 3 of substantially equal thickness. However, it will be understood that this chirp waveform may be detected by conventional techniques as well as by optical target acquisition 10 of the present invention provided with a matched filter.

Thus, as used herein, reference to "concentric rings" includes, but is not limited to, geometric shapes having contrasting optical properties such as arcs, complete rings, partial rings in the form of semicircles, sections of concentric rings occupying between one-hundred eighty and three-hundred sixty degrees, rings of varying thicknesses, and concentric spirals which approximate concentric rings. These geometric shapes may be of equal or varying thicknesses and may be concentric, eccentric or spaced-apart. It will be understood by those skilled in the art that optical target acquisition system 10 may be used to detect these acquisition targets having these varying geometries.

As used herein, "label" includes, but is not limited to, an image applied to an object as well as a discrete unit having an image applied to it wherein the discrete unit bearing the image is adapted to be associated with an object. Such a discrete unit may be provided with or without a suitable adaptation for attachment of the discrete unit to an object. The adaptation may be, for example, an adhesive backing for affixing the discrete unit to the object. Such a discrete label may be affixed to a container or other object, on the exterior surface of the container or other object. Further optically-readable information, in addition to an acquisition target, may or may not be imprinted on a discrete label or on the object.

As used herein, "optical properties" includes, but is not limited to, such properties as light absorption, reflection, and refraction properties of images represented in different media.

Figure 3:
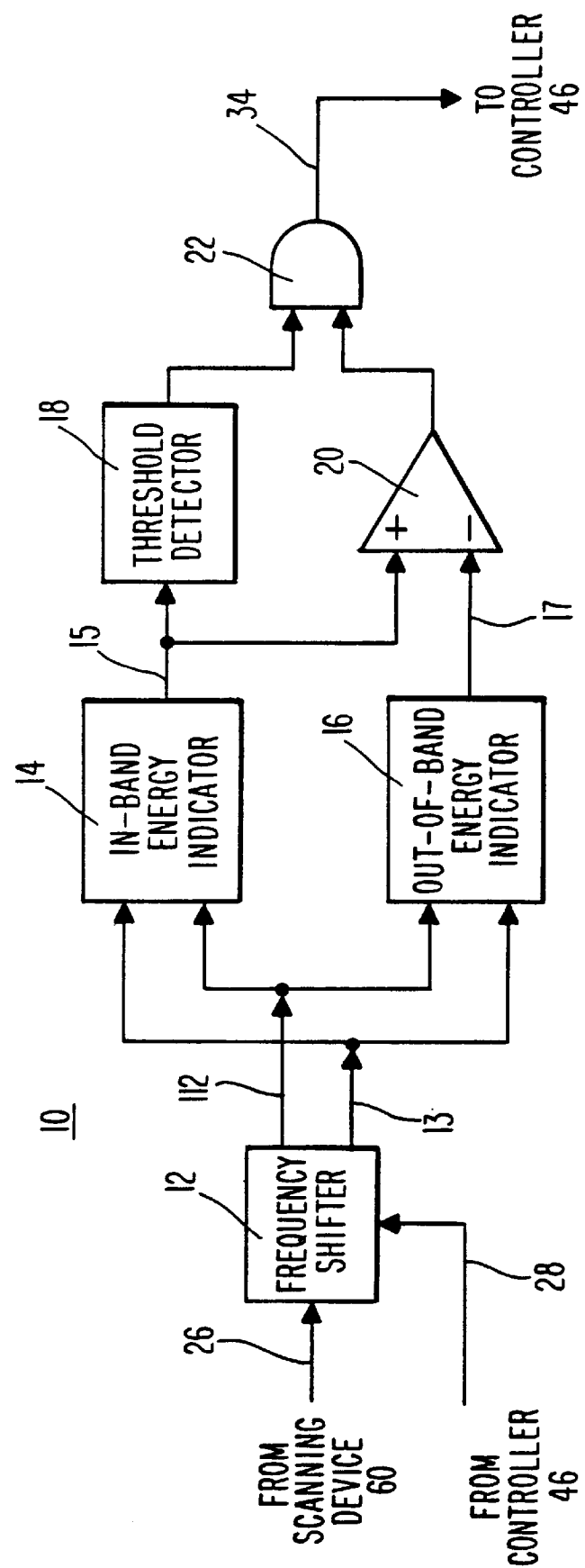
FIG. 3 shows a block diagram representation of the optical target acquisition system of the present invention for acquiring the concentric ring acquisition target of the preferred embodiment of the optically-readable label of FIG. 1.
Figure 4:
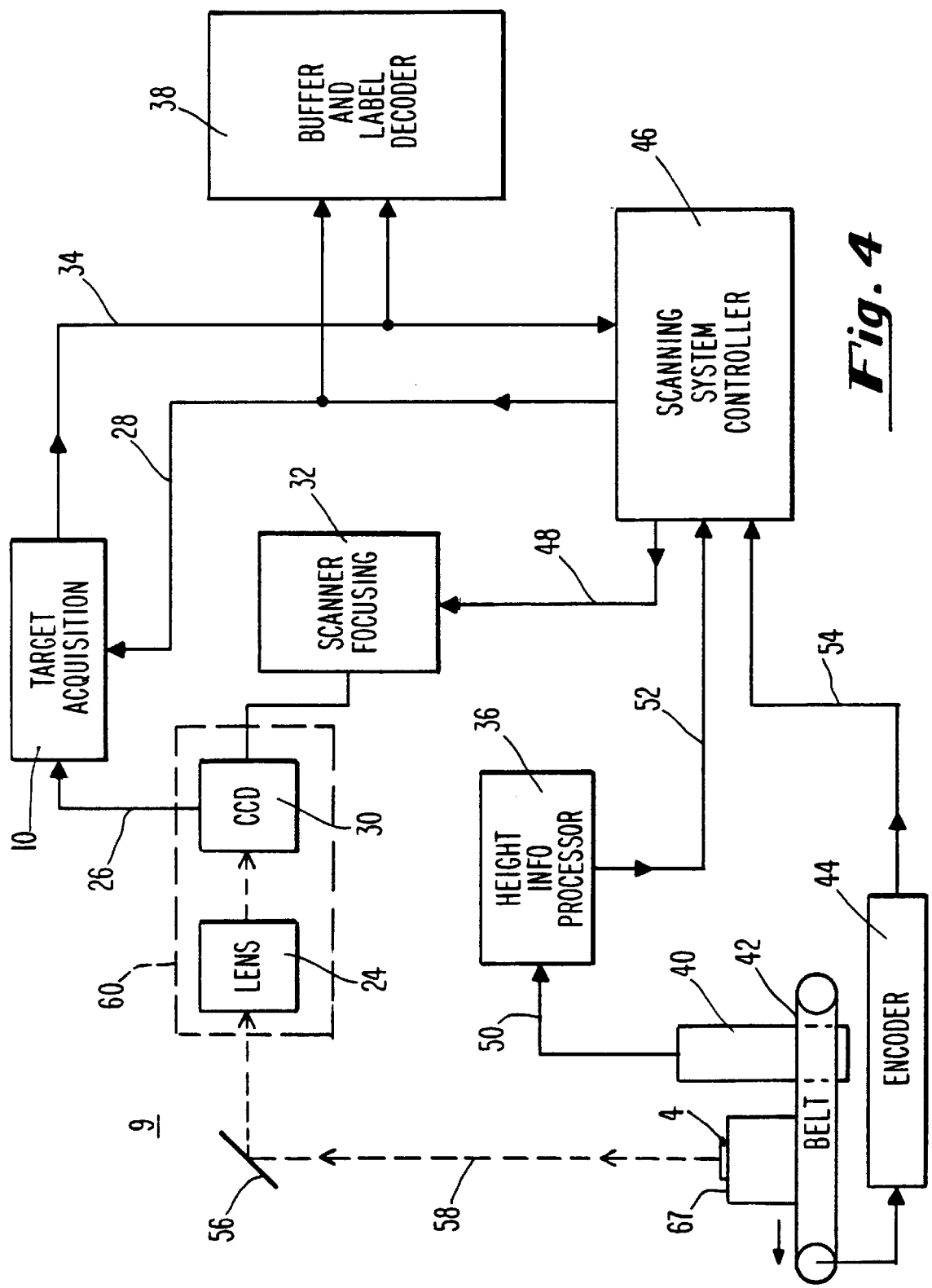
FIG. 4 shows a block diagram representation of the optical label scanning system of the present invention for providing a sampled sequence representative of the acquisition target to the target acquisition system of FIG. 3.
Figure 5:
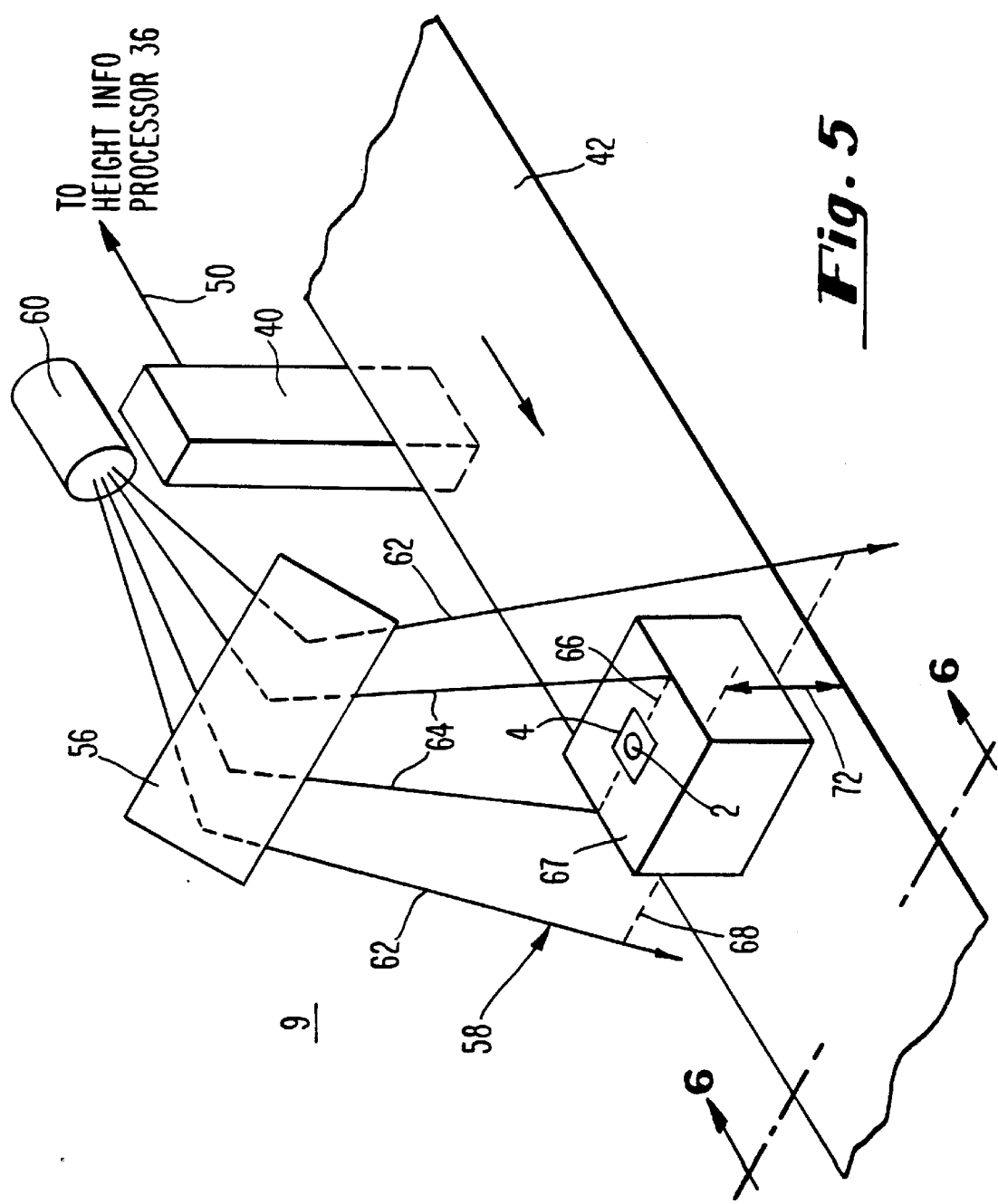
FIG. 5 is a perspective view of a portion of the optical scanning system of FIG. 4 including a conveyor belt for advancing the optically-readable labels of FIG. 1 attached to packages through a scanning field.

Referring now to FIGS. 3, 4, and 5 there is shown a block diagram representation of optical target acquisition system 10 of the present invention for acquiring and reading optically readable label 4, as well as a block diagram representation of optical label scanning system 9 and a perspective view of portions of optical label scanning system 9 including conveyor belt 42 and optical scanning device 60. Optical scanning device 60 of optical label scanning system 9 scans conveyor belt 42 and moving package 67 which is disposed upon conveyor belt 42 by means of fan shaped light ray 58 which is reflected by overhead mirror 56. Scan edge light rays 62 of fan shaped light ray 58 mark the approximate outer boundaries of fan shaped light ray 58. Thus scan edge rays 62 indicate the outer limits of the area scanned by optical scanning device 60. Scan edge light rays 68 are spread a little wider than the width of conveyor belt 42 at zero height above conveyor belt 42, as indicated at dotted line 68.

Package edge light rays 64, within fan shaped light ray 58, impinge upon opposite edges of moving package 67 and define package scanning line 66 as moving package 67 is advanced through the scanning field of optical scanning device 60. Package edge light rays 64 are within the same plane as scan edge light rays 62 of fan shaped light ray 58. Package scanning line 66 moves relative to package 67 as package 67 is scanned due to the movement of conveyor belt 42. This movement of package 67 relative to scanning line 66 causes scanning line 66 to pass through the optical field defined by optically readable label 4, including concentric ring acquisition target 2 within label 4, disposed upon moving package 67.

As moving package 67 is advanced through fan shaped light ray 58 within optical label scanning system 9, package scanning line 66 passes through the center of circle 5 of concentric ring acquisition target 2. When package scanning line 66 passes through the center of concentric ring acquisition target 2, a sampled sequence having eleven half cycles is provided at the output of charge coupled device 30 of optical scanning device 60. This sampled sequence is produced due to the alternating optical properties of the six concentric rings 3 and center circle 5 which form acquisition target 2 as previously described. Optical scanning device 60 applies the sampled sequence produced by the scan to frequency shifter 12 or resampler 12 within optical target acquisition system 10 to detect the sampled sequence representative of concentric ring acquisition target 2.

Figure 6:
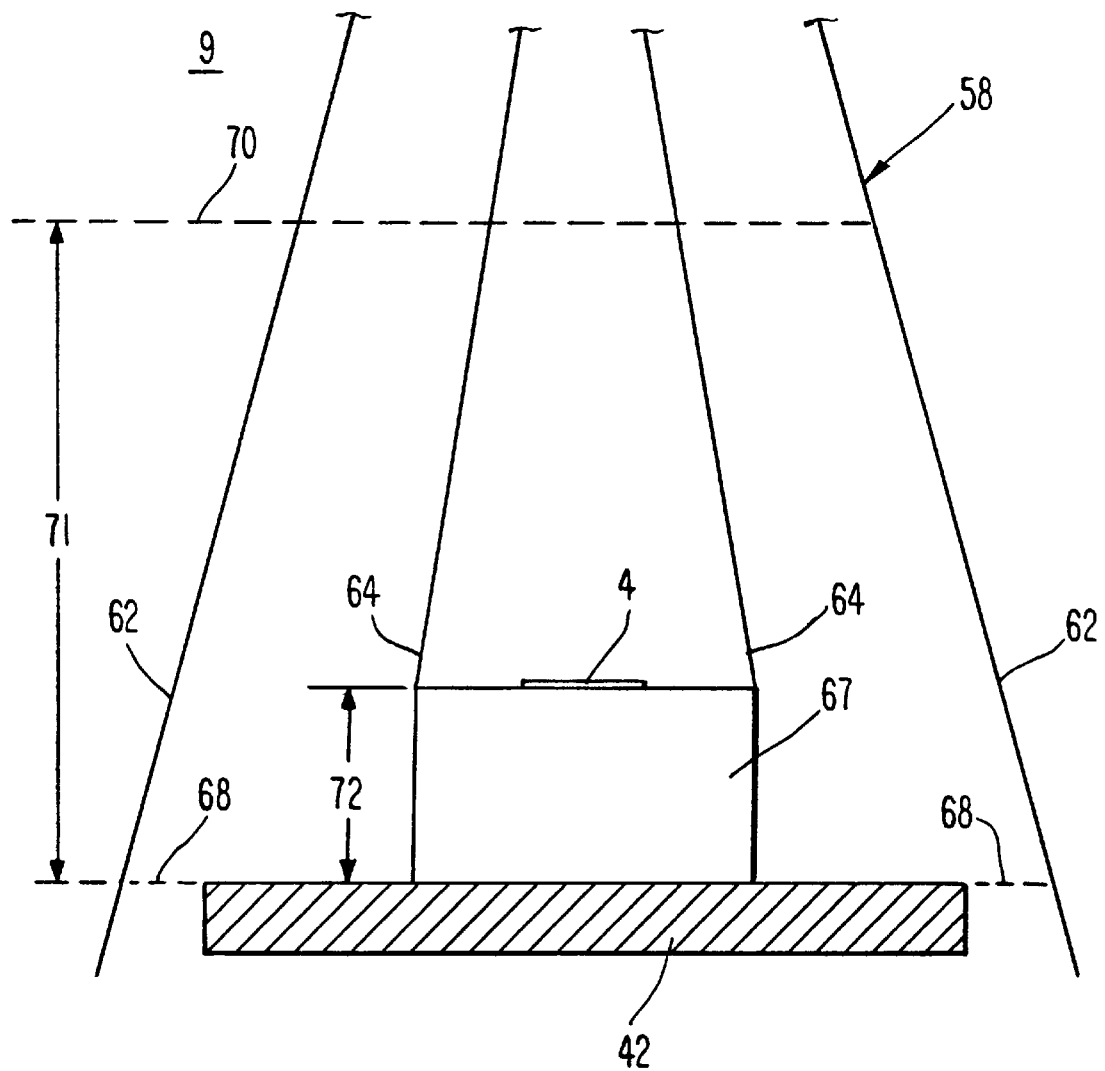
FIG. 6 is a schematic cross-sectional representation of the scanning light rays of the optical label scanning system of FIG. 4, FIGS. 7A,B are more detailed representations of alternate embodiments of the resampler or frequency shifter of the optical target acquisition system of FIG. 3.

Referring now to FIG. 6, there is shown a cross-sectional representation of a portion of optical label scanning system 9 of the present invention. The cross-section represented is through fan shaped light ray 58, bounded by scan edge light rays 62, of optical label scanning system 9. Scan edge light rays 62 and package edge light rays 64 are all disposed in the plane of fan shaped light ray 58. Four thousand ninety-six pixels are provided in each scan performed by charge coupled device 30 of optical scanning device 60 within optical scanning system 9. These four thousand ninety-six pixels represent scan information on approximately forty-six inches along dotted line 68 where magnification height 72 is zero. However, at maximum distance 71 above conveyor belt 42, when magnification height 72 is approximately equal to thirty-six inches, only thirty-six inches along dotted line 70 are represented by the same number of pixels.

Thus, concentric ring acquisition target 2 as sensed by optical scanning device 60 appears larger at a larger magnification height 72 because more samples are taken over the same horizontal scan distance. This causes the sampled sequence at the output of optical scanning device 60 to have a lower frequency when optical acquisition target 2 is scanned at a greater magnification height 72 above conveyor belt 42. Therefore optically readable label 4 appears magnified when label 4 is disposed upon moving package 67 which elevates label 4 above conveyor belt 42. This magnification is compensated by frequency shifter 12 or resampler 12 within optical label scanning system 9. Magnification height 72 above conveyor belt 42 may be limited to a maximum of thirty-six inches in the preferred embodiment of optical label scanning system 9.

In order to compensate for magnification of optically readable label 4 within optical label scanning system 9, height detector array 40 or height sensor 40 of label scanning system 9 detects magnification height 72 of the top of moving package 67 as moving package 67 is advanced by conveyor belt 42 past height detector array 40. Height detector array 40 may include, for example, infrared light emitting diodes (not shown) for sensing magnification height 72. In alternate embodiments, sonar (not shown) or other types of sensors may be used within height detector array 40 of scanning system 9 for sensing magnification height 72. Height information or distance information from height detector array 40 or height sensor 40 is applied by way of height detector array output line 50 to height information processor 36 or height calculation device 36.

After performing calculations to process the information from height detector array 40, height information processor 36 applies processed height information to scanning system controller 46 by way of line 52. Scanning system controller 46 also receives conveyor belt speed information from conveyor encoder 44. This conveyor belt speed information is received by scanning system controller 46 from conveyor encoder 44 by way of encoder line 54.

Scanning system controller 46 controls scanner focusing circuit 32 by way of focus control line 48 according to the calculations performed upon the height information applied to scanning system controller 46 by height information processor 36. Scanner focusing circuit 32 uses the calculated information representative of magnification height 72 from scanning system controller 46 to adjust the distance between charge coupled device 30 and scan focusing lens 24 of optical scanning device 60. Thus optical scanning device 60 is adjusted according to magnification height 72. This adjustment permits a focused scan of optically readable label 4 disposed upon moving package 67 to be performed by optical scanning device 60.

In the preferred embodiment of optical label scanning system 9, charge coupled device 30 of scanner 60, rather than focusing lens 24, is moved in accordance with the height information from scanner focusing circuit 32 because charge coupled device 30 has less mass than focusing lens 24. Charge coupled device 30 then applies scan information by way of target acquisition input line 26 to resampler 12 or frequency shifter 12 of optical target acquisition system 10 of the present invention. Resampler 12 within optical label scanning system 9 corrects for magnification. As previously described there is varying magnification within optical label scanning system 9 due to elevation of optically readable label 4 to varying magnification heights 72 above conveyor belt 42 by moving packages 67 of varying sizes. Varying magnification heights 72 above conveyor belt 42 cause varying scanning distances between optical scanning device 60 and acquisition target 2. Thus resampler 12 must provide varying amounts of frequency shift in order to provide varying magnification compensation within optical target acquisition system 10 of the present invention due to the varying scanning distances.

Resampler 12 of target optical acquisition system 10 provides the varying magnification correction according to magnification correction signals or frequency control signals. It will be understood by those skilled in the art that the frequency shifting within system 9 may refer either to (1) the effective shifting of a center frequency of a filter within in-band energy indicator 14 or out-of-band energy indicator 16, or (2) the effective shifting of a frequency within the input signal applied to optical target acquisition system 10 by way of target acquisition input line 26. Either type of shifting may be provided as long as it is effective to move one of these frequencies to the other or both of these frequencies to each other so that a predetermined input signal frequency may be detected.

Magnification correction signals for providing varying magnification controls are applied to resampler 12 from scanning system controller 46 by way of magnification correction control line 28. Although any standard of magnification correction nay be used, in the preferred embodiment of optical label scanning system 9 resampler 12 corrects a signal from charge coupled device 30 to normalize it to a zero height level above conveyor belt 42. Thus an optical scan signal from charge coupled device 30 containing information from a scan of optically readable label 4 is corrected such that the corrected signal at the output of frequency shifter 12 has the frequency which would appear on input line 26 if label 4 had been disposed at the level of conveyor belt 42 rather than some non-zero magnification height 72 above conveyor belt 42.

Thus, the magnification factor at the level of conveyor belt 42 of optical label scanning system 9 is defined to be unity. The sampled sequence frequency provided when concentric ring acquisition target 2 is scanned at the level of conveyor belt 42 is therefore defined to be the fundamental ring frequency of scanning system 9. Optically readable labels 4 scanned at various magnification heights 72 above conveyor belt 42 provide lower frequency signals on target acquisition input line 26 or detector input signal line 26 because they occupy a greater percentage of the scan field and more samples are taken within the same eleven half-cycles. However, when sampled sequences from concentric ring acquisition targets 2 elevated to various magnification heights 72 above conveyor belt 42 are corrected for magnification by the embodiment of system 9 wherein the frequencies of the sampled sequences are shifted, they all have a frequency substantially equal to the predetermined fundamental ring frequency. Alternately, when optical target acquisition system 10 is effective to shift the singularities of indicators 14, 16, these singularities are shifted to the frequencies resulting from the magnification.

It will be understood by those skilled in the art that various heights 72 or differing heights 72 refer to heights that vary from one moving package 67 to another and not to any variation in height which may occur during a single scan of a single moving package 67. Likewise, it will be understood that the varying or various or differing frequencies or magnifications associated with optical target acquisition system 10 refer to frequencies which vary from one moving package 67 to another rather than to frequencies or magnifications which may occur during a single scan of a single moving package 67. While height variations and corresponding magnification and frequency variations of any type may be detected by height sensor 40 and compensated within optical target acquisition system 10, in the preferred embodiment of the present invention target acquisition system 10 compensates only for variations from one moving package 67 to another.

The signal at the output of resampler 12 is simultaneously applied to in-band energy indicator 14 and out-of-band energy indicator 16 within optical target acquisition system 10. In-band energy indicator 14 is adapted to determine the level of energy at the fundamental ring frequency within the signal from optical scanning device 60. As previously described, the fundamental ring frequency is the frequency which is provided at the output of optical scanning device 60 when concentric ring acquisition target 2 is scanned at the level of conveyor belt 42.

Thus if concentric ring acquisition target 4 is disposed at a non-zero magnification height 72, the energy level detected by in-band energy indicator 14 is shifted to the detection band of in-band indicator 14 by resampler 12 in one preferred embodiment of system 9. Alternately, the singularities of in-band indicator 14 may be shifted to the frequency of the energy produced by scanning target 2, depending on the type of frequency shifting used. In the latter embodiment, when acquisition target 2 having non-zero magnification height 72 is scanned, the singularities of in-band indicator 16 are shifted accordingly.

As the center of center circle 5 of concentric ring acquisition target 2 passes through the scanning path of optical scanning device 60, fan shaped light ray 58 passes through the center of acquisition target 2. When acquisition target 2 is elevated to differing non-zero magnification heights 72 above conveyor belt 42, differing frequency signals representative of magnified acquisition target 2 are applied to resampler 12. When any of these differing frequencies is applied to the input of resampler 12, the fundamental ring frequency or target frequency representative of acquisition target 2 appears at output line 13 of resampler 12 after correction of the input frequency signals in accordance with the signals of magnification control line 28 when frequency shifter 12 is adapted to shift input signal frequencies rather than singularity frequencies. The signals of magnification control line 28 are applied to frequency shifter 12 by scanning system controller 46 in accordance with information representative of magnification height 72 of moving package 67 upon which acquisition target 2 is disposed.

The presence of the fundamental ring frequency at output line 13 of resampler 12 causes an increase in the in-band energy level applied to in-band energy indicator 14. This in-band energy is due to the eleven half-cycles produced by the optical contrast between center circle 5 and adjacent concentric rings 3 within concentric ring acquisition target 2. When this occurs indicator output line 15 of in-band energy indicator 14 of optical target acquisition system 10 goes high. When the center of concentric ring acquisition target 2 is scanned by optical scanning device 60 and the in-band energy level increases, the out-of-band energy level simultaneously decreases. This decrease in out-of-band energy is detected by out-of-band energy indicator 16 causing the amplitude of indicator output line 17 to decrease.

The output of in-band energy indicator 14 and the output of out-of-band energy indicator 16 are applied to energy ratio comparator 20 by way of indicator output lines 15, 17 respectively. Energy ratio comparator 20 performs a ratio comparison of the in-band energy level and the out-of-band energy level. When the ratio of in-band energy, as indicated on output line 15 of in-band energy indicator 14, to the out-of-band energy, as indicated on output line 17 of out-of-band energy indicator 16, reaches a predetermined level, the output of energy ratio comparator 20 goes high. A high output of energy ratio comparator 20 indicates the probable presence of concentric ring acquisition target 2 of optically readable label 4 in the scanning path of optical scanning device 60.

The output of in-band energy indicator 14 is also applied to threshold detector 18 or threshold comparator 18 of optical target acquisition system 10 by way of indicator output line 15. A fixed dc level is applied to threshold comparator 18 in addition to the output of in-band energy indicator 14. The output of threshold comparator 18 goes high when the output of in-band energy indicator 14 reaches a predetermined threshold as determined by the fixed dc level applied to the input of threshold comparator 18. The output of threshold comparator 18 and energy ratio comparator 20 are applied to target acquisition output AND gate 22 within optical target acquisition system 10. The output of target acquisition output AND gate 22 is applied to scanning system controller 46 by way of target acquisition trigger line 34.

A trigger signal appears on target acquisition trigger line 34 at the output of AND gate 22 goes high only when: (1) the ratio of the in-band energy level to the out-of-band energy level is high, and (2) the in-band energy level exceeds a predetermined threshold or set point. Target acquisition trigger line 34 therefore goes high when optical target acquisition system 10 determines that concentric ring acquisition target 2 is scanned by optical scanning device 60. Target acquisition trigger line 34 is applied to scanning system controller 46 for control of optical label scanning system 9. Target acquisition trigger line 34 is also applied to buffer and label decoder 38 so that data from optically readable label 4 may be read, stored, and decoded. Data is acquired within optical scanning system 9 only when a trigger signal is applied to target acquisition trigger line 34.

Figure 7A:
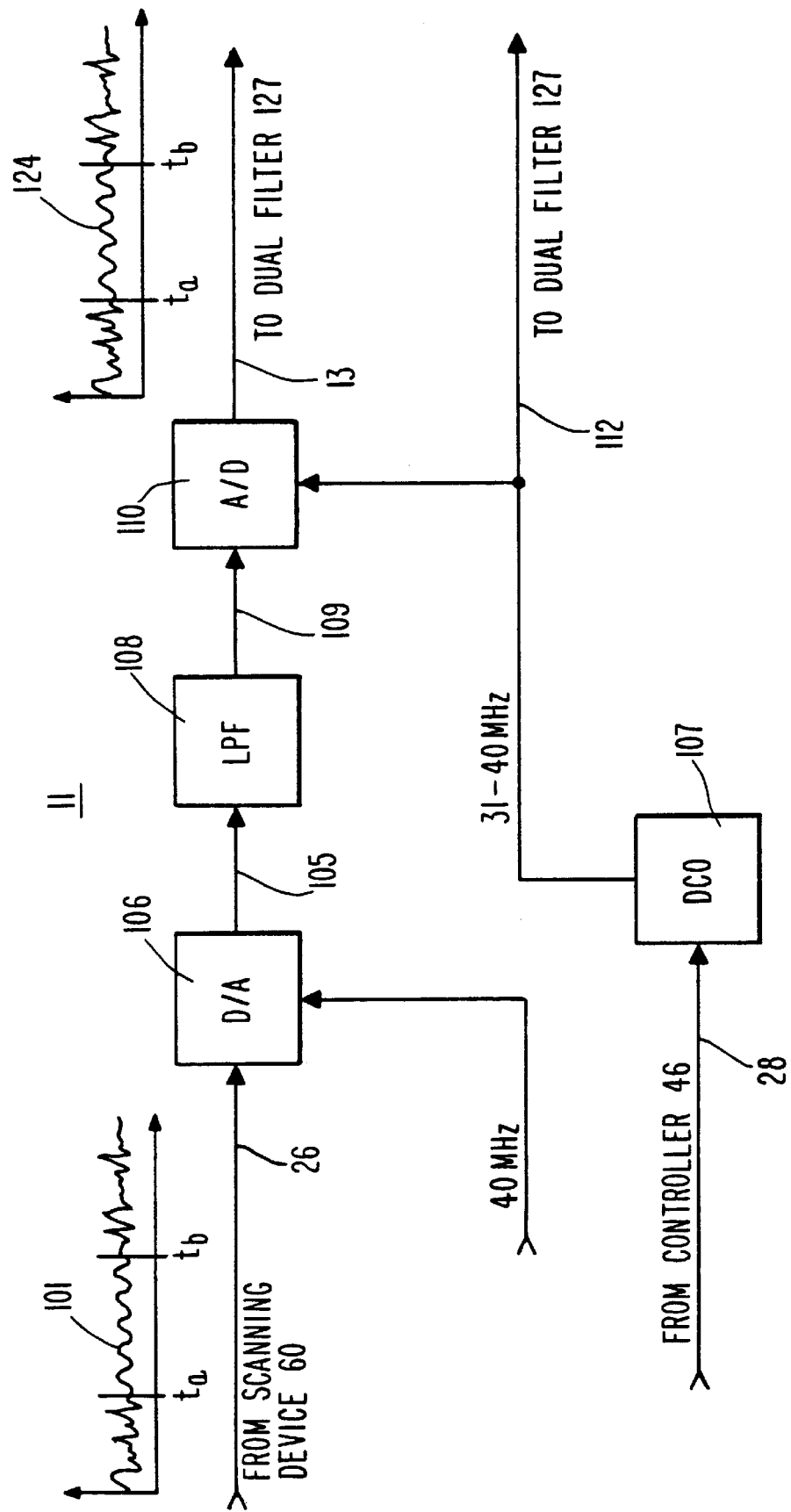
Figure 7B:
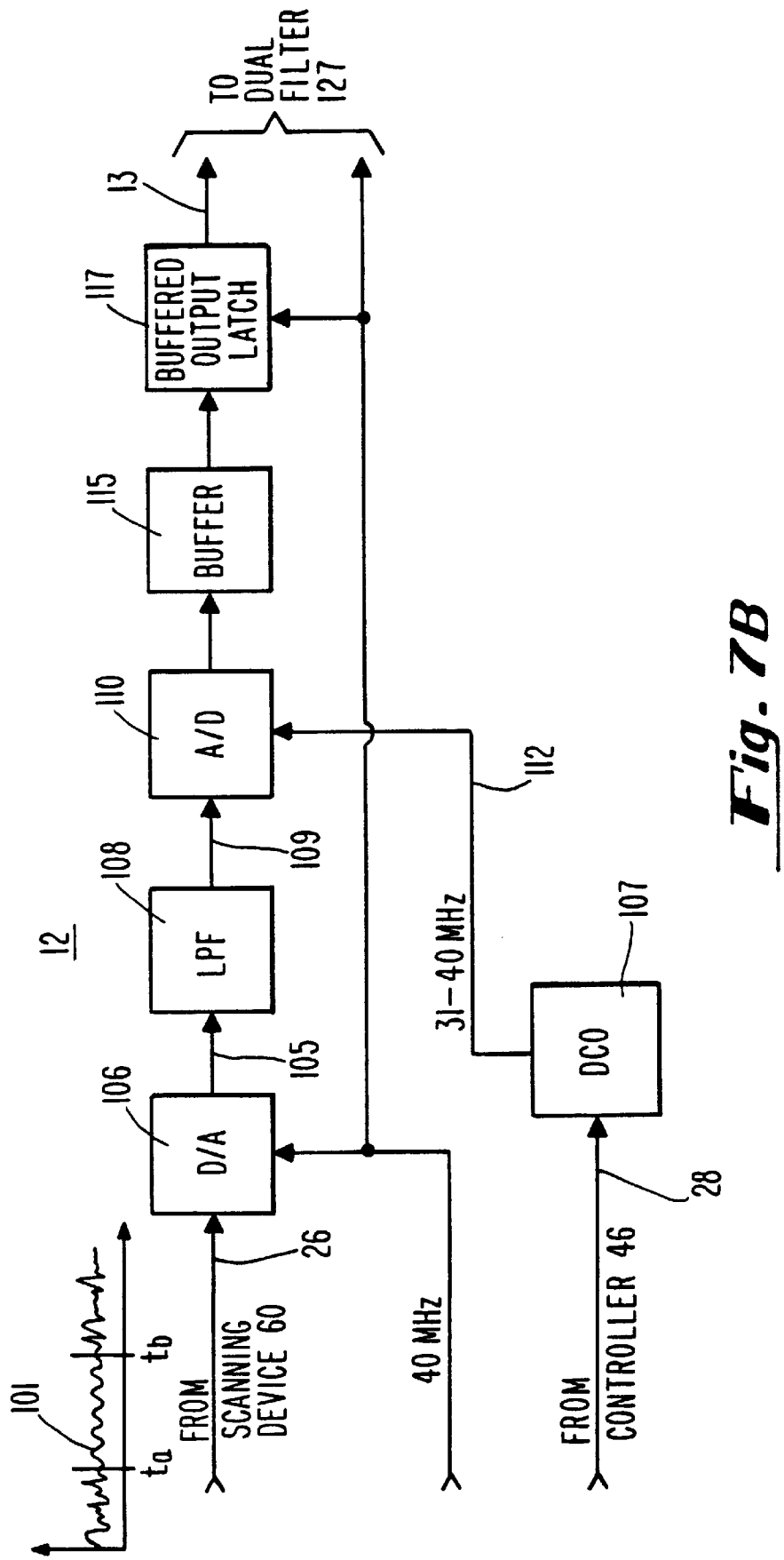

Referring now to FIGS. 7A,B, there are shown more detailed representations of frequency shifter 11 or resampler 11 within optical target acquisition system 10 of the present invention as well as frequency shifter 12. Frequency shifter 11 is an alternate embodiment of frequency shifter 12 or resampler 12. Sampled sequence 101 is applied to the input of resamplers 11, 12 by way of target acquisition input line 26 from charge coupled device 30 of optical scanning device 60. The waveform of target acquisition input line 26 includes sampled sequence 101 during the time interval $t_a$ to $t_b$ when the center of concentric ring acquisition target 2 passes the scanning path of optical scanning device 60. Random signals appear on input line 26 before and after the time interval from $t_a$ to $t_b$.

When sampled sequences 101 having varying frequencies due to varying magnification are applied to resamplers 11, 12, they provide corresponding differing amounts of frequency shift. These differing frequency shifts may be applied either to the frequencies of sampled sequence 101 or to the singularity frequencies of indicators 14, 16 in alternate embodiments of target acquisition system 10. The frequency shift provided by resampler 11 is effective to produce compensated signal waveform 124 or resampled signal waveform 124 having the fundamental ring frequency at frequency shifter output line 13. The frequency shift provided by frequency shifter 12 is effective to shift the singularities of dual filter circuitry 127.

Sampled sequence 101 is applied to digital-to-analog converter 106 of resamplers 11, 12 within optical target acquisition system 10 by way of frequency shifter input line 26. Digital-to-analog converter 106 provides an analog signal corresponding to sampled sequence 101 for magnification correction in accordance with magnification height 72 of moving package 67 bearing concentric ring acquisition target 2. The height information used in magnification correction is sensed by height detection array 40 as moving package 67 is advanced by conveyor belt 42 and processed by height information processor 36. The processed height information from scanning system controller 46 is applied to resampler 12 by scanning system controller 46 by way of magnification control line 28.

Digital-to-analog converter 106 may be clocked by a fixed forty megahertz clock signal applied to converter 106 by way of digital-to-analog converter clock line 104. The converted input signal appears at the output of digital-to-analog converter 106 and is applied to low pass filter 108 by way of digital-to-analog output line 105. Low pass filter 108 is provided within resampler 12 of optical target acquisition system 10 to eliminate the high frequency content of the signal at the output of digital-to-analog converter 106 due to aliasing. Low pass filter 108 thereby provides anti-aliasing within resampler 12 of optical target acquisition system 10. The filtered analog signal at the output of low pass filter 108 is applied by way of filter output line 109 to analog-to-digital converter 110.

During conversion to a digital signal by analog-to-digital converter 110 within resampler 11, the converted analog signal from low pass filter 108 which is applied to converter 110 by way of line 109 is resampled at an adjustable resampling rate or a varying resampling rate. It is because frequency shifters 11, 12 are both thus provided with resampling during the shifting process that they may be referred to as resamplers 11, 12. The adjustable or varying resampling rate of analog-to-digital converter 110 of resampler 11 is determined by a varying frequency clock signal or varying frequency control signal. The varying frequency control signal is applied to analog-to-digital converter 110 and to energy indicators 14, 16 so that energy indicators 14, 16 may be clocked at the correct rate required to shift the singularities to the frequency corresponding to the measured height 72.

Analog-to-digital converter 110 of resampler 12 applies its output to buffer 115 which is output latched and applied to dual filter circuitry 127 by buffered output latch 117. Output latch 117 is clocked by the forty megahertz line which is also used to clock dual filter circuitry 127. Because the output applied to dual filter 127 and to dual filter itself 127 are clocked at the same fixed rate while analog-to-digital converter 110 is clocked at the variable rate, frequency shifter 12 is effective to shift the singularities of dual filter 127.

The resampling clock signal frequency of variable clock line 112 may vary between thirty-one megahertz and forty megahertz according to magnification height 72 above conveyer belt 42 at which optically readable label 4 is scanned by optical scanning device 60. The maximum resampling frequency of forty megahertz occurs when an optically readable label 4 is at the level of conveyer belt 42 and magnification height 72 is zero. When label 4 is at this level the sampling rate of digital-to-analog converter 106 and the resampling rate of analog-to-digital converter 110 are both equal to forty megahertz. Therefore, the magnification factor is unity when concentric ring acquisition target 2 is scanned at the level of conveyer belt 42 and no magnification correction is performed by resamplers 11, 12.

The minimum resampling frequency of thirty-one megahertz on variable clock line 112 occurs when concentric ring acquisition target 2 is disposed at a magnification height 72 of thirty-six inches above conveyer belt 42. This corresponds to maximum magnification height 71 above conveyer belt 42 and the maximum frequency compensation by resampler 12 within optical target acquisition system 10. The variable clock frequencies ranging from thirty-one megahertz to forty megahertz are generated by digitally controlled oscillator 107 according to height information which is applied to digitally controlled oscillator 107 from scanning system controller 46 by way of magnification control line 28. Resampled signal waveform 124, at the output of analog-to-digital converter 110, is thus compensated for magnification height 72 of optically readable label 4 above conveyer belt 42 by the adjustable resampling rate.

In the preferred embodiment of target acquisition system 10 the clocking frequency of digital-to-analog converter 106 is fixed and the clocking frequency of analog-to-digital converter 110 or reconverter 110 is varied in order to shift the frequencies of input signal 101 of line 26. However, it will be understood by those skilled in the art that the clocking frequency of converter 106 may be varied and the clocking frequency of reconverter 110 may be fixed in order to shift the frequencies of sampled sequence 101. Furthermore, it will be understood that both the clocking frequency of converter 106 and the clocking frequency of reconverter 110 may be varied.

However, it will be understood by those skilled in the art that other interpolation and decimation techniques may also be used for shifting of frequencies. In the preferred embodiment of frequency shifter 12, wherein the various frequencies produced by varying magnification are frequency shifted to a predetermined fundamental frequency, the various frequency shifts required may be provided by any known method of frequency shifting prior to applying compensated signed waveform 124 of line 13 to energy indicators 14, 16.

Additionally, it will be understood that resampling rate control information from scanning system controller 46 may be calculated to provide differing frequency shifts adapted to shift input frequencies to differing output frequencies rather than to a single frequency. Such an alternative embodiment (not shown) is distinguished from shifting all input frequencies to the same fundamental frequency, as in the preferred embodiment. In this alternate embodiment the differing frequencies may be applied to differing filters for detection.

Figure 8:
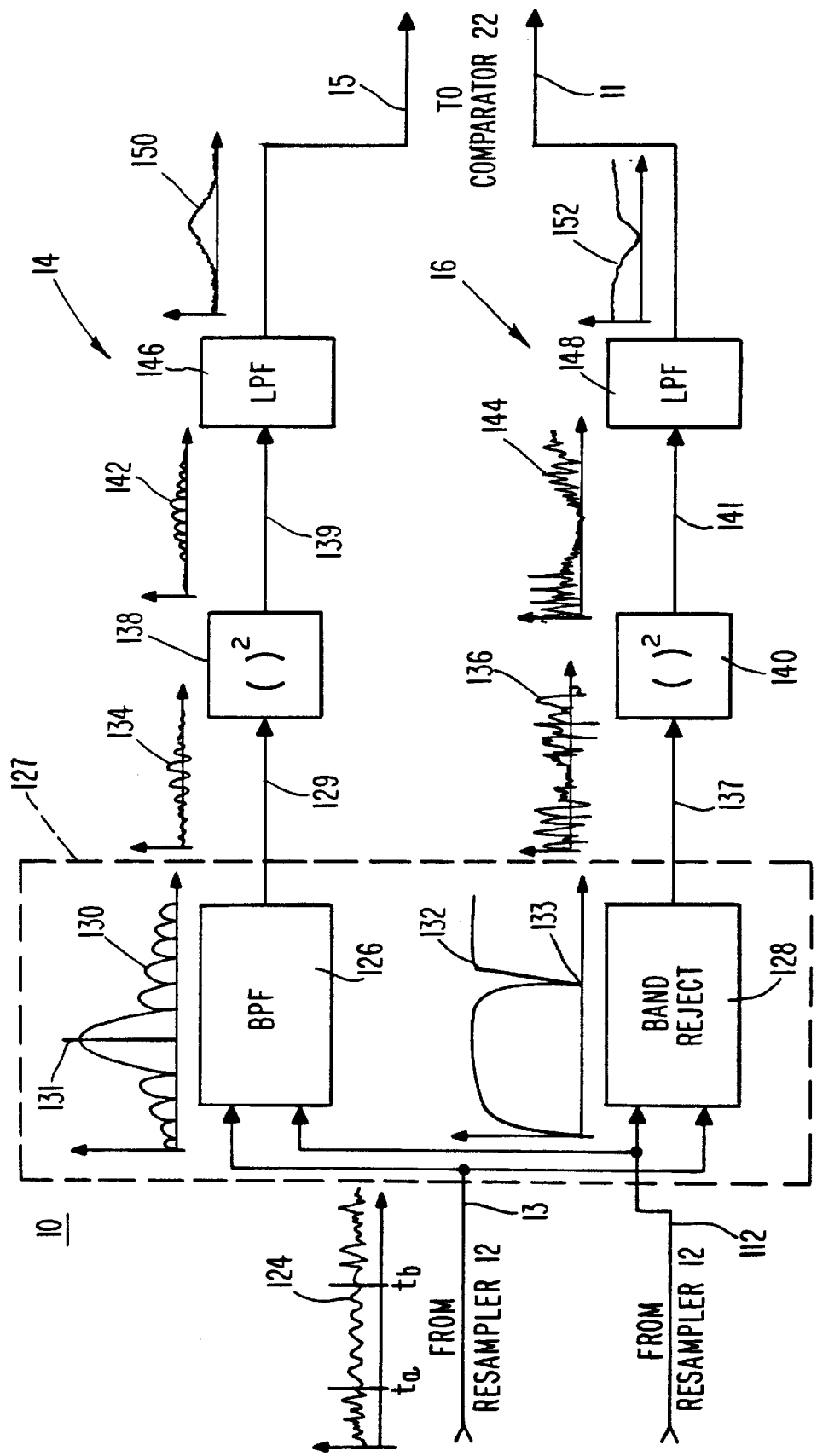
FIG. 8 is a more detailed block diagram representation of portions of the optical target acquisition system of FIG. 3.

Referring now to FIG. 8, there is shown a more detailed representation of portions of optical target acquisition system 10 of the present invention for acquiring an optical target such as concentric ring optical acquisition target 2. Within optical target acquisition system 10, compensated signal waveform 124 at the output of resampler 12 is applied to dual filter circuitry 127 by way of frequency shifter output line 13. Dual filter circuitry 127 includes bandpass filter 126 for determining the level of in-band energy within compensated waveform 124 and band reject filter 128 or notch filter 128 for determining the level of out-of-band energy within compensated signal waveform 124. Dual filter circuitry 127 processes resampled signal waveform 124 to permit comparing of the in-band energy level with the out-of-band energy level for detecting the target frequency within signal waveform 124.

Compensated signal waveform 124 or frequency shifter output line 13 is formed of generally sinusoidal samples during the time interval from $t_a$ to $t_b$ when the center of concentric ring acquisition target 2 is in the scanning path of optical scanning device 60. Compensated signal waveform 124 is formed of random signals outside that time interval. Frequency shifter output line 13 from analog-to-digital converter 110 of resampler 12 is preferably at least six bits wide, but may be wider.

Figure 9:
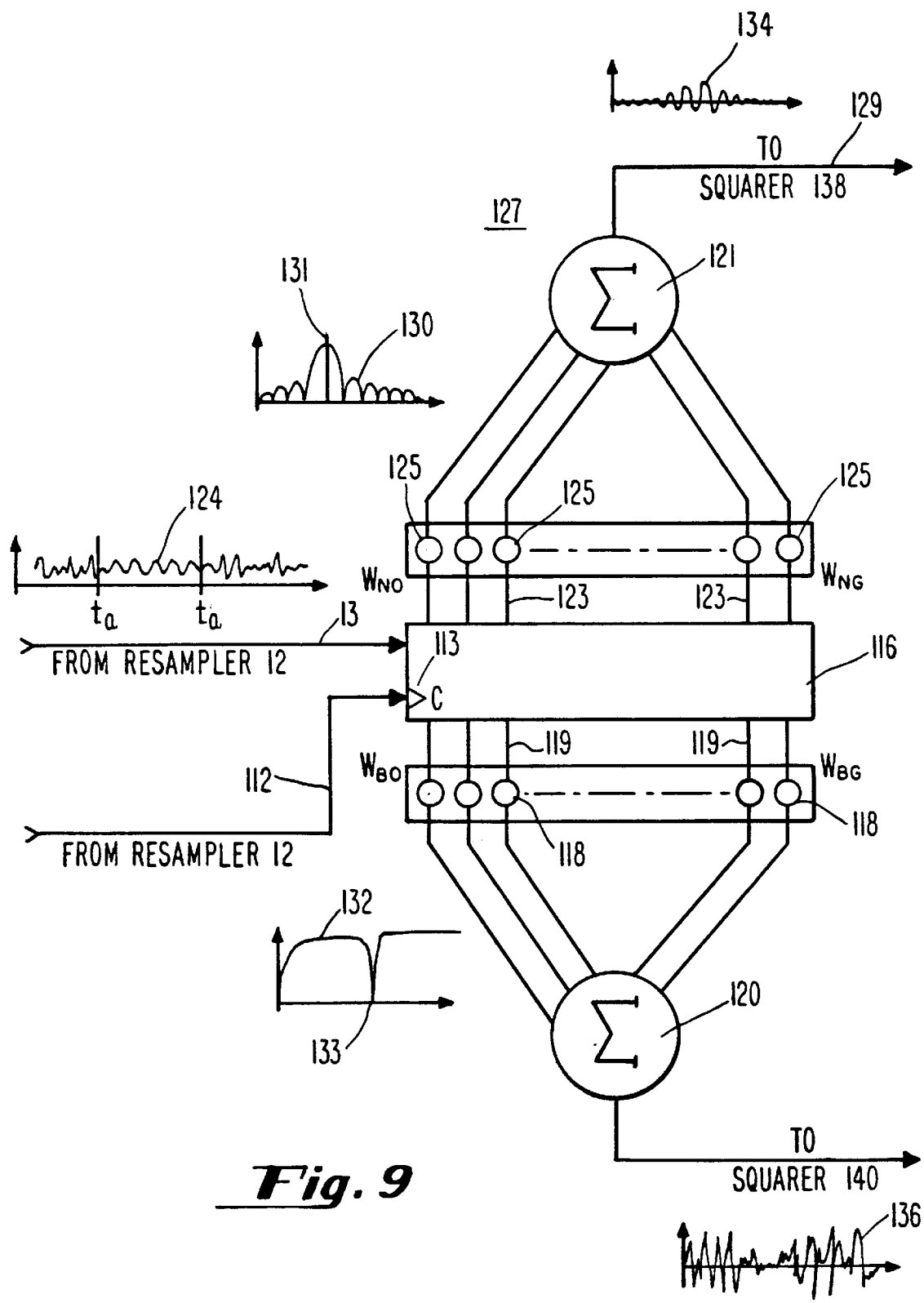
FIG. 9 is a more detailed schematic representation of the dual filter circuity of the optical target acquisition system of FIG. 3.

Referring now to FIG. 9, there is shown dual filter circuitry 127 of optical target acquisition system 10. Dual filter circuitry 127 includes bandpass filter 126 and band reject filter 128 of optical target acquisition system 10. As previously described, compensated signal waveform 124 is applied to dual filter circuitry 127 from resampler 12 by way of frequency shifter output line 13. Additionally, the frequency control signal of digital control oscillator 107 is applied to shift register clock input terminal 113 of dual filter circuitry 127 by way of variable clock line 112. Clocking of filter delay shift register 116 by the frequency control signal from oscillator 107 is provided in order to permit shifting of resampled waveform 124 through shift register 116 according to magnification information.

It is believed that this provides a virtual shift or an effective shift of the singularities of filters 126, 128 according to the height of package 67. Within dual filter circuitry 127, bandpass filter 126 and band reject filter 128 are provided with respective weighting functions 125, 118 in order to provide the required bandpass and band reject filter responses as graphically represented by respective filter response waveforms 130, 132. It will be understood that when frequency shifter 12 is used optical within target acquisition system 10, the forty megahertz clock line, rather than variable clock line 112, is received by input terminal 113 of shift register 116.

Filter delay shift register 116 of dual filter circuitry 127 is common to both bandpass filter 126 and band reject filter 128. Filter delay shift register 116 may be a conventional delay shift register, clocked at the same rate as converter 110, for serving as a delay line within dual filter circuitry 127 of optical target acquisition system 10. Filter delay shift register 116 is provided with a plurality of delay line output taps 119 for use within band reject filter 128 in association with weighting functions 118. Filter delay shift register 116 is also provided with a plurality of delay line output taps 123 for use within bandpass filter 126 in association with weighting functions.

When the rate at which data is shifted into filters 126, 128 is varied by applying a variable clocking rate or resampling rate to clock input 113 of shift register 116, the method of present invention is conceptualized as a virtual shifting or an effective shifting of the center frequencies or singularities of filters 126, 128. However, it is also believed the method of resampler 11 may alternately be conceptualized as a virtual shifting or an effective shifting of the frequency of a signal waveform applied to resampler 12 by way of target acquisition input line 26.

Likewise, the method of resampler 12 may alternately be viewed as either virtual or effective shifting of the frequency of sampled sequence 101, or as shifting of the singularities of dual filter 127. Care must be taken in this latter embodiment to avoid trying to shift data into shift register 116 before the data is available. Thus frequency shifting within optical target acquisition system 9 includes 1) shifting a signal frequency to a singularity frequency, and 2) shifting a singularity frequency to a signal frequency. Furthermore, it will be understood that the term "frequency shifting", as used herein, refers to both of these types of frequency shifting.

Regardless of which of these ways the the frequency shifting is performed however, it: will be understood by those skilled in the art that a frequency within sampled sequence waveform 101, representative of a scan of concentric rings 2, and the relevant frequencies of the singularities of filters 126, 128 are shifted to each other by the frequency shifting of system 9. Any method of method of bringing these frequencies to each other is within the scope of frequency shifting as used herein. Furthermore, it will be understood that when shifting the input frequency of resampler 12 to the singularity frequency of dual filter 127, other known methods of frequency shifting may be used. This frequency shifting of either the signal or of the singularity is effective to permit detection of elevated optical acquisition target 2 as if target 2 had been scanned at the level of conveyor belt 42 and had produced the fundamental ring frequency.

Each delay line output tap 119, 123 within dual filter circuitry 127 is associated with a respective interval of delay time and a respective weight $W_{NO}$ to $W_{NG}$ or $W_{BO}$ to $W_{BG}$. In the preferred embodiment of optical target acquisition system 10, bandpass filter 126 is provided with twenty three delay line output taps 123 and band reject filter 128 is provided with twenty-three delay line output taps 119. It will be understood by those skilled in the art that the number of delay line output taps 199, 123 determines the number of zeros or singularities of dual filter circuitry 127 and that filters 126, 128 may be provided with more than twenty-three taps or fewer than twenty-three taps 119, 123.

Each delay line output tap 119 of band reject filter 128 of filter delay shift register 116 is applied to a respective band reject weighting function 118. Respective band reject weighting functions 118 individually weight each delay line output tap 119 of shift register 116 in order to realize the required band reject filter characteristics of band reject filter 128. In the preferred embodiment of band reject filter 128, weighting function 118 of each delay line output tap 119 is a fixed resistor (not shown) value or a ground connection.

The values of the effective filter coefficients are selected in a conventional manner well known to those skilled in the art in order to realize band reject filter response waveform 132 having a notch frequency 133. The selection of resistors to realize the effective filter coefficients is calculated off line. Notch frequency 133 or singularity point 133 of filter response curve 132 describing the response of band reject filter 132 within optical target acquisition system 10 of the present invention is selected to be the fundamental ring frequency.

The weighted outputs of band reject weighting functions 118 are applied to summer circuit 120 for summation. Summer circuit 120 may be a conventional summing function. Bandpass output waveform 136, applied by summer circuit 120 to band reject filter output line 137, is thus the sum of the signals of all weighted output taps 119 of band-reject filter 128. Band-reject filter 128 or notch filter 128 may be provided with twenty-three zeros or singularities. The zeros of notch filter 128 may all be placed at the same frequency to provide a sharp roll off and a narrow notch at frequency 133. However some zeros may be used to reduce the dc response of notch filter 128.

Delay line output taps 123 of filter delay shift register 116 are provided to form bandpass filter 126 of dual filter circuitry 127. Delay line output taps 123 are applied to respective bandpass weighting functions 125 for the purpose of individually weighting each output tap 123 of shift register 116. Weighting functions 125 are fixed resistors (not shown) selected to provide bandpass filter response waveform 130 of bandpass filter 126 have a peak response at frequency 131 or singularity point 131, the fundamental ring frequency. Thus, in one preferred embodiment when resampler 12 provides varying shifts to the varying frequencies provided by optical scanning device 60 when acquisition target 2 is scanned at varying magnification heights 72, the varying frequencies are all shifted to the fixed singularities of bandpass filter 126.

The weighted outputs from bandpass weighting functions 125 are applied to summer circuit 121 of bandpass filter 126 for summation. Summer circuit 121 may be a conventional summing function for receiving a plurality of input levels and providing a sum of the received input levels. Output waveform 134, applied by summer circuit 121 to bandpass; output line 129, is thus the sum of the signals of all output taps 123 of shift register 116 weighted by respective weighting functions 125.

Thus, within dual filter circuitry 127 of optical target acquisition system 10, resampled signal waveform 124 is applied to bandpass filter 126 by way of frequency shifter output line 13. Resampled signal waveform 124 may be processed by fixed singularities bandpass filter 126 in accordance with an amplitude versus frequency filter response curve represented by bandpass filter response waveform 130. Alternately, the singularities of filter 126 may be moved according to height information as waveform 124 is applied to filter 126. Bandpass filter response waveform 130 is determined by fixed bandpass weighting resistors providing a peak response at center frequency 131.

Compensated signal waveform 124 or resampled signal waveform 124 at the output of resampler 12 is applied to band reject filter 128 by way of frequency shifter output line 13 at the same time that waveform 124 is applied to bandpass filter 126. Simultaneous processing of compensated waveform 124 is performed by band reject filter 128 in accordance with an amplitude versus frequency filter response curve represented by band reject filter response waveform 132. Band reject filter response waveform 132 is determined by fixed band reject weighting functions 118. The weights $W_{BO}$ to $W_{BL}$ of band reject filter 128 and the weights $W_{NO}$ to $W_{NL}$ of bandpass filter 126 may be determined by a conventional resistive network.

Center frequency 131 or singularity point 131 of bandpass filter response waveform 130 of bandpass filter 126 is selected to be substantially equal to the fundamental ring frequency. This fundamental ring frequency corresponds to the frequency of the sampled sequence 101 produced when the center of concentric ring acquisition target 2 is disposed at magnification height 72 above conveyor belt 42 equal to zero. Sampled sequences corresponding to non-zero magnification heights 72 may be frequency shifted to this fundamental frequency according to the height information from sensor 40. Additionally, singularity point 131 may be shifted according to height information when waveform 124 is applied to filter 126. Bandpass filter 126 is a finite impulse response filter wherein the amplitude versus frequency filter response curve represented by bandpass filter response waveform 130 is obtained by selecting the appropriate bandpass weighting functions 125.

Similarly, notch frequency 133 of band reject filter response waveform 132 of band reject filter 128 is selected to be substantially the fundamental ring frequency of concentric ring acquisition target 2. Thus notch frequency 133 is approximately equal to center frequency 131 of bandpass filter response waveform 130 of bandpass filter 126. Band reject filter 128 is also a finite impulse response filter. The amplitude versus frequency filter response curve represented by band reject filter response waveform 132 is obtained by selection of the proper values of band reject weighting functions 118. In one preferred embodiment of band reject filter 128, most of the zeros or singularities are selected to be at the fundamental ring frequency of concentric ring acquisition target 2. Some zeros are used to provide a roll off at dc.

Bandpass filter 126 and band reject filter 128 of dual filter circuitry 127 are both selected to be finite impulse response filters rather than infinite impulse response filters having feedback. Therefore the outputs of filters 126, 128 last only while sampled sequence 124, corresponding to concentric ring acquisition target 2, is present within filter delay shift register 116. In the preferred embodiment of dual filter circuitry 127, shift register 116 is exactly the same length as the number of samples scanned across acquisition target 2. Thus, compensated signal waveform 124 should completly fill shift register 116.

As previously described, when concentric ring acquisition target 2 is scanned through its center, as indicated by scanning line 66 of fan shaped light ray 58 or scan ray 58, a signal having a finite duration of eleven half-cycles is produced. The level of trigger line 34 is determined only by the amount of data corresponding to these eleven half-cycles. This permits a short duration tone to be detected accurately within optical target acquisition system 10 and would not be necessary if a long tone were available within label scanning system 9. This is necessary within optical label scanning system 90 because conveyor belt 42 of scanning system 9 moves concentric rings 2 of optical acquisition target 4 past scanning device 60 at high speed.

This speed may be approximately one hundred inches per second. If optical scanning system 9 is provided with sampling rates in excess of forty megahertz, the speed of conveyor belt 42 may be five hundred inches per second. When the twenty-three bits representing sampled waveform 124 are in position within shift register 116, optical target acquisition 10 system must recognize them very reliably. Thus, dual filter 127 is a matched filter which is matched to the length of optical acquisition target 2.

The output of bandpass filter 126 is graphically represented by bandpass filtered waveform 134. Bandpass filtered waveform 134 or bandpass output line 129 has a substantially sinusoidal shape within a triangular envelop during the time interval when the center of concentric ring acquisition target 2 is in the scanning path of optical scanning device 60. Waveform 134 has a substantially smaller response before and after that time interval. The output of band reject filter 128, graphically represented by band reject filtered waveform 136, includes a flat period or quiet period corresponding to the time interval when the fundamental ring frequency notched out by band reject filter 128 is present in shift register 116 due to scanning of the center of concentric ring acquisition target 2 by optical scanning device 60. Filtered waveform 136, on band reject output line 137, includes random signals before and after that time interval.

Filtered waveform 134, the output of bandpass filter 126 on bandpass filter output line 129, may be applied to squaring means 138. In the preferred embodiment of optical target acquisition system 10, squaring means 138 is provided for squaring applied filtered waveform 134. However, any conventional means for providing an absolute value of filtered waveform 134 may be used within in-band energy indicator 14 in place of squaring means 138. Means for providing the absolute value of filtered waveform 134 produce full wave rectification of filtered waveform 134.

The output of squaring means 138 is graphically represented as squared waveform 142 wherein squaring of filtered waveform 134 has been provided by squaring means 138. Squared waveform 142 is applied to low pass filter 146 by way of squarer output line 139 to generate in-bend energy indicator waveform 150. In-band energy indicator waveform 150 at the output of low pass filter 146 is high during the period when sampled sequence 101 corresponds to the fundamental frequency of the concentric rings acquisition target 2. In-band energy indicator waveform 150, at the output of low pass filter 146, is thus adapted to be high while the center concentric ring acquisition target 2 is in the scanning path of optical scanning device 60. In-band energy waveform 150 is adapted to be substantially zero the rest of the time when random signals are applied to optical target acquisition system 10 by way of target acquisition input line 26.

The output of squaring means 140 is graphically represented as squared waveform 144, wherein squaring of band reject filtered waveform 136 has been provided by squaring means 140. Means for taking an absolute value of band reject filtered waveform 136 may be provided rather than squaring means 140 to provide full wave rectification of waveform 136. Squared waveform 144 at the output of squaring means 140 is applied to low pass filter 148 by way of squarer output line 141 to generate out-of-band energy indicator waveform 152. A low level of amplitude of out-of-band waveform 152 appears on the output of low pass filter 148 during the period when sampled sequence 124 corresponds to the fundamental frequency of concentric ring acquisition target 2. Out-of-band energy indicator waveform 152 is thus adapted to be low while the center of concentric ring acquisition target 2 is in the scanning path of optical scanning device 60 and non-zero the rest of the time when random signals are applied to optical target acquisition system 10 by way of target acquisition input line 26.

Thus, in-band energy indicator waveform 150, at the output of low pass filter 146 and processed by way of bandpass filter 126, has a high value during the time interval of the scanning of the center of concentric ring acquisition target 2 by optical scanning device 60. Out-of band energy indicator waveform 152, at the output of low pass filter 148 and processed by way of band reject filter 128, has a low value during the time interval of scanning of the center of concentric ring acquisition target 2 by optical scanning device 60. Both in-band energy waveform 150 and out-of-band energy waveform 152 are applied to energy ratio comparator 20.

Figure 10:
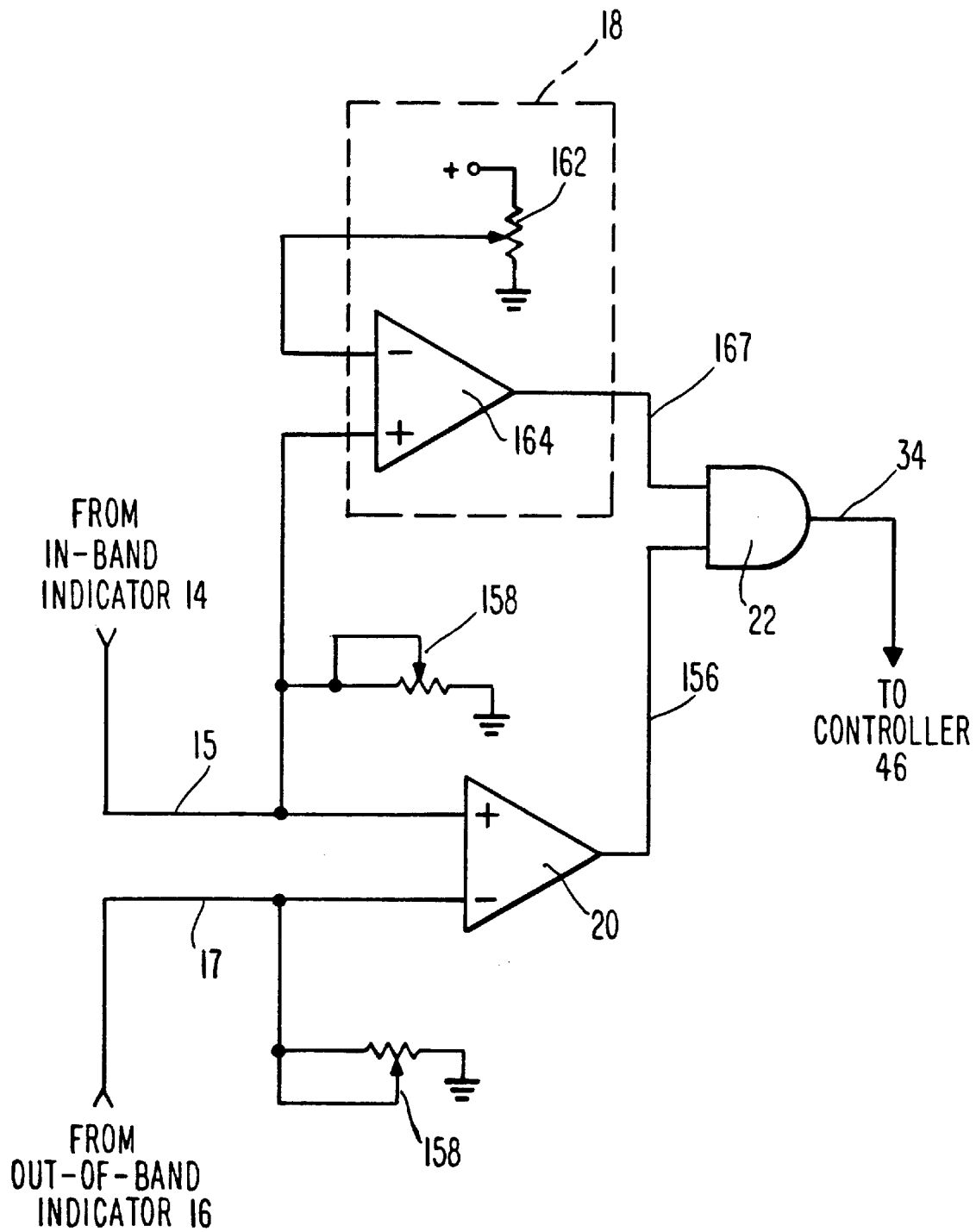
FIG. 10 is a more detailed block diagram representation of further portions of the optical target acquisition system of FIG. 3.

Referring now to FIG. 10, there is shown a more detailed representation of the comparison and logic portions of optical target acquisition system 10. Within optical target acquisition system 10, energy ratio comparator 20 receives the energy level of the output of low pass filter 146 and the energy level of the output of low pass filter 148 by way of indicator lines 15, 17 respectively. The output levels of low pass filter 146 and low pass filter 148 may be adjusted with any conventional gain adjustment device 158.

The two energy levels at the outputs of filters 126, 128 are compared by energy ration comparator 20 to provide a binary output on comparator output line 156. The binary output on line 156 of energy ratio comparator 20 indicates that the fundamental ring frequency or a magnified representation of the fundamental ring frequency may have been applied to optical target acquisition system 10 by way of target acquisition input line 26. The determination made by energy ratio comparator 20 is a determination of whether there is more energy in the band of interest than outside the band of interest. The band of interest is understood to be a narrow band centered around the fundamental frequency of concentric ring acquisition target 2 after shifting of signals corresponding to magnified targets by resampler 12.

A second comparison is performed within optical target acquisition system 10 in addition to the comparison by energy ratio comparator 20. The second determination is made in order to confirm whether concentric ring acquisition target 2 is in the scanning path of optical scanning device 60 as indicated by the output of energy ratio comparator 20. In-band energy threshold comparator 18 performs the second comparison. In the comparison performed by in-band energy threshold comparator 18, in-band energy indicator waveform 150 at the output of low pass filter 146, is applied to the positive input of in-band energy threshold comparator 18. Because the input: of low pass filter 146 is processed by way of bandpass filter 126, in-band energy waveform 150 is representative of the amount of energy within the frequency band of interest, the fundamental ring frequency of the concentric rings of acquisition target 2.

Thus, as previously described, the level of in-band energy waveform 150 rises during the time interval that the center of concentric ring acquisition target 2 is in the scanning path of optical scanning device 60. The negative input of in-band energy threshold comparator 18 is coupled to conventional gain adjustment means 162 coupled between a fixed voltage source and ground to provide an adjustable dc threshold. Thus, the output of in-band energy threshold comparator 18 goes high only when the energy within the band of interest rises above a predetermined threshold which may be varied using gain adjustment device 162. By adjusting gain adjustment device 162, the detect threshold of optical target acquisition system 10 may be varied.

The output of in-band energy threshold comparator 18, which compares the energy in the band of interest with the fixed dc threshold, is applied to comparator AND gate 22 by way of threshold comparator output line 167. The output of energy ratio comparator 20 is applied to comparator AND gate 22 by way of ratio comparator output line 156. The output of comparator AND gate 22, provided at target acquisition trigger line 34 of comparator AND gate 22, goes high when: (1) there is more energy in the band of interest than outside the band of interest, as determined by energy ratio comparator 20, causing ratio comparator output line 156 to go high, and (2) the amount of energy within the band of interest is above a fixed threshold as determined by in-band energy threshold comparator 18 causing threshold comparator output line 167 to go high.

Figure 11:
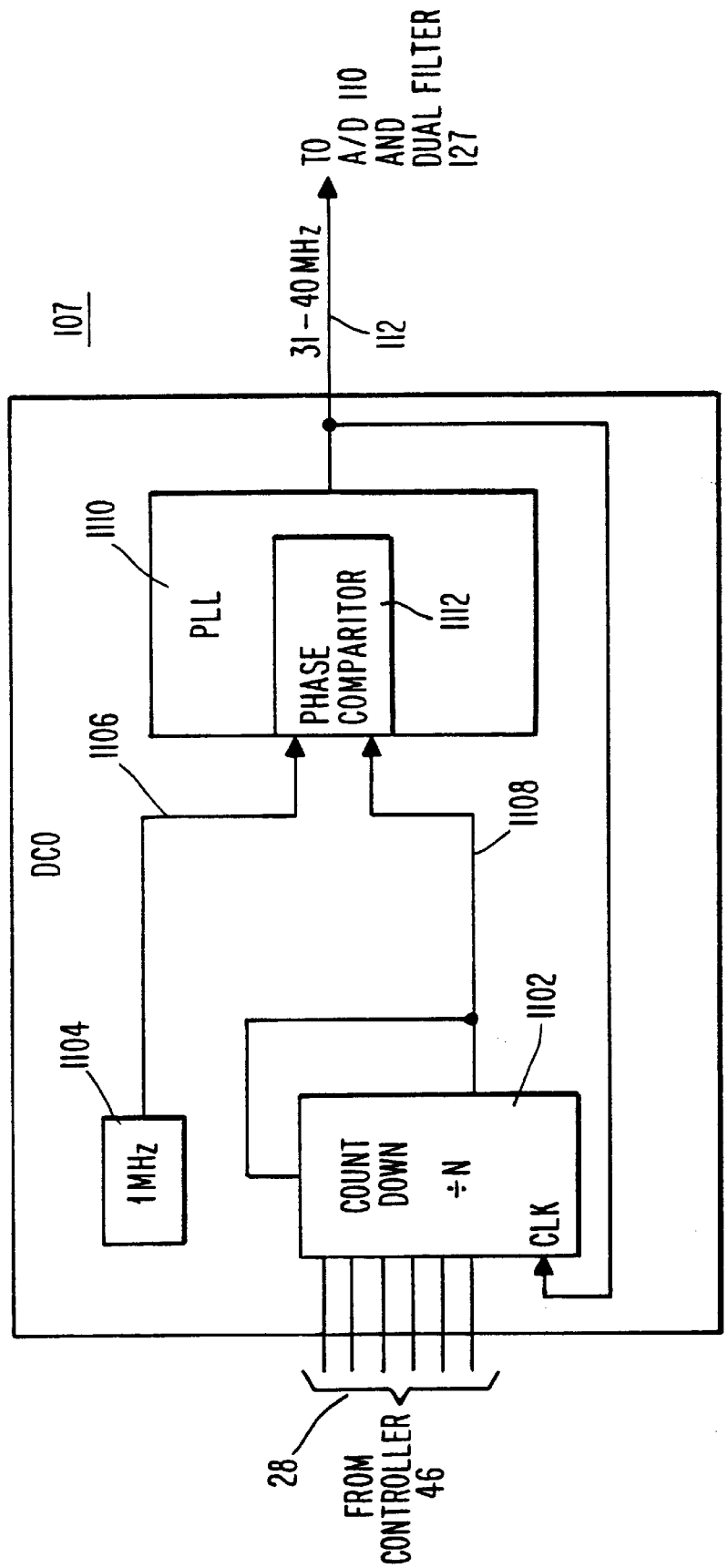
FIG. 11 is a more detailed schematic representation of the digital control oscillator of the optical acquisition system of FIG. 3.

Referring now to FIG. 11, there is shown a more detailed representation of digital control oscillator 107. Digital control oscillator 107 is provided with down counter 1102 having a divide by N output. Down counter 1102 is coupled to scanning system controller 46 by way of magnification control line 28. The values loaded into down counter 1102 by way of magnification control line 28 are retrieved from a look-up table (not shown) by scanning system controller 46. The look-up table converts height information from height information processor 36 into a six bit height value adapted to provide the required frequency control signals on output line 112 of oscillator 107. The frequency control signals on output line 112 are applied to analog-to-digital converter 110 to provide a variable resampling rate within converter 110 according to the height information applied to oscillator 107 from controller 46 by way of magnification control line 28. These control signals may also be applied to shift register 116 of dual filter 127.

For example, if a thirty-one megahertz signal is required at the output of digital control oscillator 107 in response to a height determination by height information processor 36, the value thirty-one is loaded into down counter 1102 by way of line 28. These loaded values are counted down by down counter 1102 until they are zeroed and a terminal count is produced on line 1108. The terminal count provides a phase reference within digital control oscillator 107. Additionally, the terminal count on line 1108 is fed back to down counter 1102 to cause down counter 1102 to repeatedly preload the height value received from controller 46 by way of magnification control line 28.

Digital control oscillator 107 is also provided with one megahertz local oscillator 1104. Local oscillator 1104 provides a local reference signal on line 1106. The local reference signal on line 1106 and the terminal count on line 1108 are applied to conventional phase comparator 1112 within conventional phase locked loop 1110. The phase difference between the terminal count and the local reference signal causes phase locked loop 1110 to change its output frequency. Thus a variable resampling rate between thirty-one and forty megahertz is provided in discrete one megahertz steps on output line 112 of digital control oscillator 107. Other configurations (not shown) may provide courser or finer control. This variable resampling rate signal is applied to analog-to-digital converter 110 and delay shift register 116 to provide variable frequency shifting within resampler 12.

Figure 12:
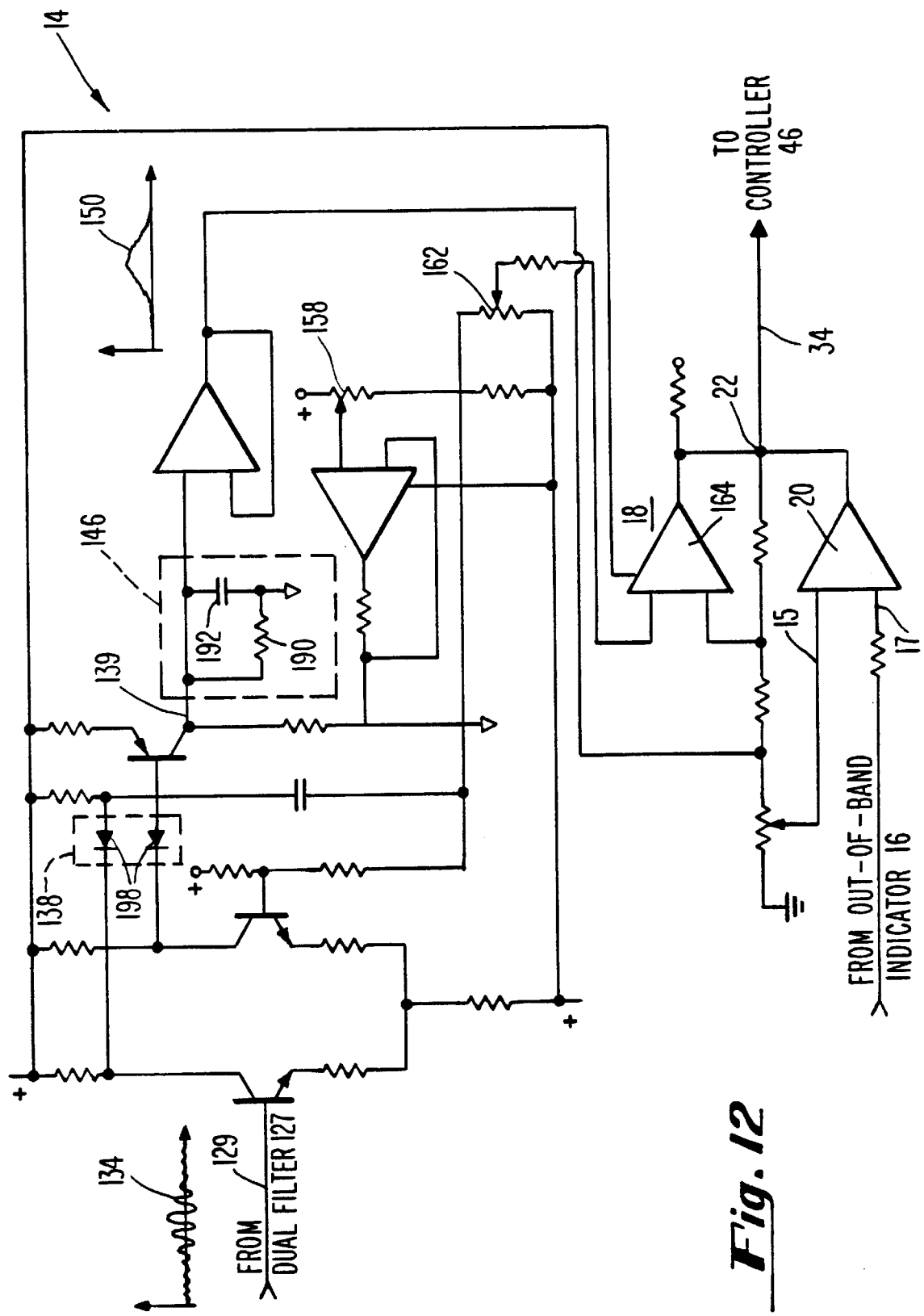
FIG. 12 is a more detailed representation of the in-band energy detector within the target acquisition system of FIG. 3.
Figure 13:
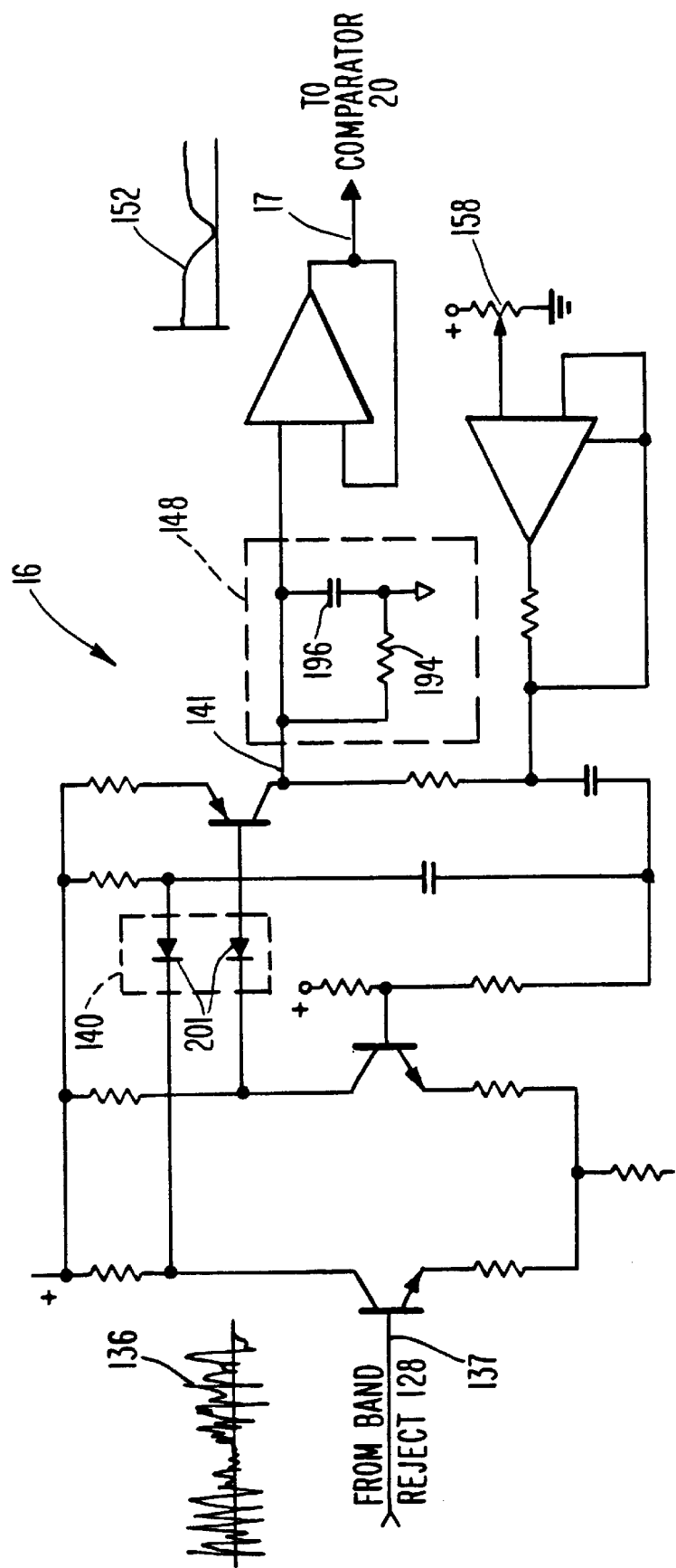
FIG. 13 is a more detailed schematic representation of the out-of-band energy detector within a target acquisition system of FIG. 3.

Referring now to FIGS. 12, 13, there is shown a more detailed schematic representation of portions of in-band energy indicator 14 and out-of-band energy indicator 16, including squarer 138, 140, and low pass filters 146, 148, as well as in-band energy threshold comparator 18 and energy ratio comparator 20. Waveform 134, the output of bandpass filter 126, appears on line 129 of squarer 138 and is applied to diodes 198 of squarer 138. The absolute value of waveform 134 from bandpass filter 126 is provided within in-band energy indicator 14 by means of diodes 198 within squarer 138. The output of squarer 138 is applied to RC low pass filter 146 by way of squarer line 139. RC low pass filter 146 includes parallel resistor 190 and capacitor 192.

Waveform 136, the output of band reject filter 128, appears on line 137 from notch filter 128. Waveform 136 is applied to diodes 201 of squarer 140 for providing the absolute value of waveform 136 within out-of-band energy detector 16. The absolute value of waveform 136 is applied to RC low pass filter 148 by way of squarer output line 141. Low pass filter 148 includes parallel resistor 194 and capacitor 196. The output of low pass filter 146 and the output of low pass filter 148 are applied to energy ratio comparator 20 in order to compare the in-band energy of sampled sequence 101 with the out-of-band energy of sampled sequence 101. Additionally, the output of low pass filter 146 is applied to in-band energy threshold comparator 18. It will be understood by those skilled in the art that the wired OR arrangement at the output of comparators 18, 20 performs the logical AND function of AND gate 22. When the output of comparators 18, 20 are both high, trigger line 34 at the output of optical target acquisition system 10 goes high indicating that concentric ring acquisition target 2 is passing through the scanning path of optical scanning device 60.

It will be understood that various changes in the details, materials and arrangements of the parts which have been described and illustrated in order to explain the nature of this invention may be made by those skilled in the art without departing from the principle and scope of the invention as expressed in the following claims.

We claim:

1. An optical target acquisition system for acquiring an optical target affixed to a surface of a package, comprising:
   an optical scanning device for scanning said surface of said package and generating an optical target input signal;
   a height sensor for sensing a height associated with said surface of said package and generating a height signal representative of a scanning distance between said optical target and said optical scanning device;
   first converting means for receiving said optical target input signal and converting said optical target input signal in accordance with a first sampling frequency to provide a converted input signal;
   means for adjusting a second resampling frequency in accordance with said height signal;
   second reconverting means for receiving said converted input signal and reconverting said converted input signal in accordance with said second resampling frequency to generate a frequency shifted optical target signal; and
   means for acquiring said optical target on said surface of said package in accordance with said frequency shifted optical target signal.

2. The system of claim 1, wherein said first converting means comprises digital-to-analog converting means for converting a digital signal into an analog signal and said reconverting means comprises analog-to-digital converting means for converting an analog signal into a digital signal.

3. The system of claim 1, said system having a plurality of singularity frequencies and said optical target input signal having signals of a plurality of differing input frequencies, said system further comprising varying means, wherein said varying means is adapted to provide corresponding differing frequency shifting for providing an equality frequency equal to both a singularity frequency of said plurality of singularity frequencies and an input signal frequency of said plurality of input signal frequencies.

4. The system of claim 3, wherein said equality frequency is a single predetermined fundamental frequency of said optical target input signal provided when said optical scanning device scans said optical target at a predetermined scanning distance.

5. A method for acquiring an optical target affixed to a surface of a moving package with an optical scanning device, comprising the steps of:

(a) sensing a height associated with said surface of said package and generating a height signal representative of a scanning distance between said optical target and said optical scanning device;

(b) scanning said surface of said package with said optical scanning device to generate an optical target input signal;

(c) first receiving said optical target input signal and first converting said optical target input signal in accordance with a first sampling frequency to provide a converted input signal;

(d) adjusting a second resampling frequency in accordance with said height signal;

(e) second receiving said converted input signal and reconverting said converted input signal in accordance with said second resampling frequency to generate a frequency shifted optical target signal; and (f) providing a signal responsive to said frequency shifted optical target signal for indicating acquisition of said target.

6. The method of claim 5, wherein step (c) comprises converting a digital signal to an analog signal by means of a digital-to-analog converter and step (e) comprises converting an analog signal to a digital signal by means of an analog-to-digital converter.

7. The method of claim 5, wherein a plurality of singularity frequencies are provided, and said optical target input signal is provided with a plurality of differing input signal frequencies, comprising the further step of providing corresponding differing frequency shifting for providing an equality frequency, said equality frequency being equal to both a singularity frequency of said plurality of singularity frequencies and an input signal frequency of said plurality of input signal frequencies.

8. The method of claim 7, wherein said equality frequency is a single predetermined fundamental frequency of said optical target input signal provided when said optical scanning device scans said optical target at a predetermined scanning distance.

* * * * *

UNITED STATES PATENT AND TRADEMARK OFFICE
CERTIFICATE OF CORRECTION

PATENT NO. : 5,982,950
DATED : November 9, 1999
INVENTOR(S) : Shah et al.

It is certified that error appears in the above-identified patent and that said Letters Patent is hereby corrected as shown below:

Column 23,
Line 1, change "differing" to -- different --.

Signed and Sealed this

Twentieth Day of November, 2001

Attest:

NICHOLAS P. GODICI
*Attesting Officer*  *Acting Director of the United States Patent and Trademark Office*